United States Patent
Yao et al.

(10) Patent No.: US 9,984,570 B2
(45) Date of Patent: May 29, 2018

(54) TRAFFIC CONTROL METHOD, NETWORK SIDE DEVICE AND TERMINAL

(71) Applicant: China Mobile Communications Corporation, Beijing (CN)

(72) Inventors: Kun Yao, Beijing (CN); Tingting Zhao, Beijing (CN); Jiakang Shi, Beijing (CN); Yi Liu, Beijing (CN); Jing Yang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 0 days. days.

(21) Appl. No.: 15/109,307

(22) PCT Filed: Dec. 30, 2014

(86) PCT No.: PCT/CN2014/095593
§ 371 (c)(1),
(2) Date: Jun. 30, 2016

(87) PCT Pub. No.: WO2015/101291
PCT Pub. Date: Jul. 9, 2015

(65) Prior Publication Data
US 2016/0328963 A1 Nov. 10, 2016

(30) Foreign Application Priority Data
Dec. 31, 2013 (CN) .......................... 2013 1 0753059

(51) Int. Cl.
*G08G 1/07* (2006.01)
*G08G 1/08* (2006.01)
(Continued)

(52) U.S. Cl.
CPC ............. *G08G 1/08* (2013.01); *G08G 1/0112* (2013.01); *G08G 1/0133* (2013.01);
(Continued)

(58) Field of Classification Search
CPC ...... G08G 1/08; G08G 1/0112; G08G 1/0133; G08G 1/0145; G08G 1/096716; G08G 1/096741; G08G 1/096775; H04L 67/00
(Continued)

(56) References Cited

U.S. PATENT DOCUMENTS

2008/0012726 A1* 1/2008 Publicover ............. G08G 1/095
340/932
2008/0218380 A1* 9/2008 Wall ....................... G08G 1/081
340/907

(Continued)

FOREIGN PATENT DOCUMENTS

CN 101639984 A 2/2010
CN 101789185 A 7/2010
(Continued)

OTHER PUBLICATIONS

International Search Report and Written Opinion (including English translation) issued in corresponding International Application No. PCT/CN2014/095593, dated Apr. 21, 2015, 20 pages.
(Continued)

*Primary Examiner* — Kerri McNally
(74) *Attorney, Agent, or Firm* — Arch & Lake LLP

(57) ABSTRACT

A traffic control method, a network side device and a terminal are provided. The traffic control method includes steps of: determining a matching relationship between vehicles and roads in accordance with vehicle data of all vehicles on the roads forming an intersection, and sending traffic control signals to the vehicles meeting a certain condition in accordance with the matching relationship between the vehicles and the roads. With such technical solution, it is able to control the vehicles moving toward the intersection without any traffic light control system, thereby reducing the risk of traffic accidents there.

12 Claims, 9 Drawing Sheets

(51) Int. Cl.
    *G08G 1/01*      (2006.01)
    *G08G 1/0967*    (2006.01)
    *H04W 4/00*      (2018.01)
    *H04W 4/04*      (2009.01)
    *G08G 1/052*     (2006.01)

(52) U.S. Cl.
    CPC ..... *G08G 1/0145* (2013.01); *G08G 1/096716* (2013.01); *G08G 1/096741* (2013.01); *G08G 1/096775* (2013.01); *H04W 4/008* (2013.01); *H04W 4/046* (2013.01); *G08G 1/052* (2013.01)

(58) Field of Classification Search
    USPC ......................................................... 340/911
    See application file for complete search history.

(56)         References Cited

U.S. PATENT DOCUMENTS

2009/0109061 A1*  4/2009  McNew ................. G08G 1/164
                                                        340/928
    2010/0060483 A1   3/2010  McNew et al.
    2010/0214126 A1   8/2010  Publicover
    2011/0046873 A1   2/2011  Nagase
    2011/0205086 A1   8/2011  Lamprecht et al.
    2012/0033123 A1   2/2012  Inoue et al.
    2012/0038491 A1   2/2012  Publicover
    2016/0027301 A1   1/2016  Publicover

FOREIGN PATENT DOCUMENTS

CN        102034361 A       4/2011
    CN        102568222 A       7/2012
    CN        103065478 A       4/2013
    CN        103069465 A       4/2013
    CN        202976485 U       6/2013
    CN        203038472 U       7/2013
    CN        103473939 A      12/2013
    JP         10302200 A      11/1998
    WO      2010103504 A1       9/2010

OTHER PUBLICATIONS

First Office Action (including English translation) issued in corresponding Chinese Patent Application No. 201310753059.3, dated May 30, 2016, 14 pages.
Second Office Action (including English translation) issued in corresponding Chinese Patent Application No. 201310753059.3, dated Feb. 3, 2017, 9 pages.
Extended European Search Report issued in corresponding EP Application No. 14876339, dated Aug. 7, 2017, 9 pages.
International Search Report for International application No. PCT/CN2014/095593 dated Apr. 21, 2015.

* cited by examiner

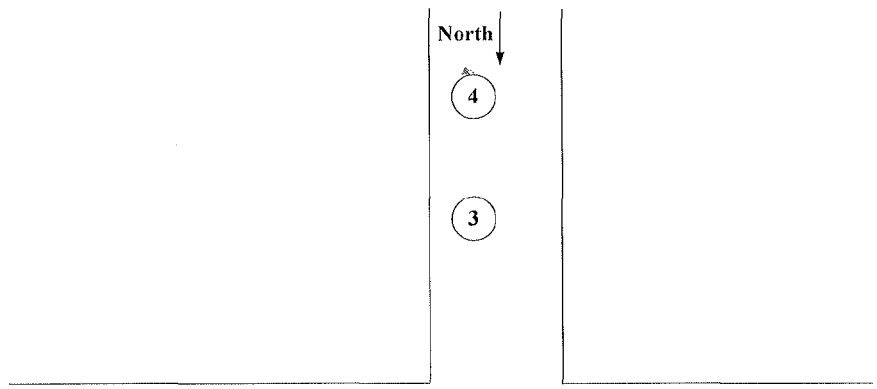

201 — after it is determined that the traffic control signals need to be sent, the vehicles in the first time region in each direction are determined in accordance with a predetermined first time length, a predetermined first reference time length and the arrival time lengths, and the vehicles in the second time region in each direction are determined in accordance with current road-condition information, the first time length and the arrival time lengths 202 — traffic control signals are sent to the vehicles in the first time regions in the respective directions, and traffic control signals are sent to the vehicles in the second time regions in the respective directions

Fig.2

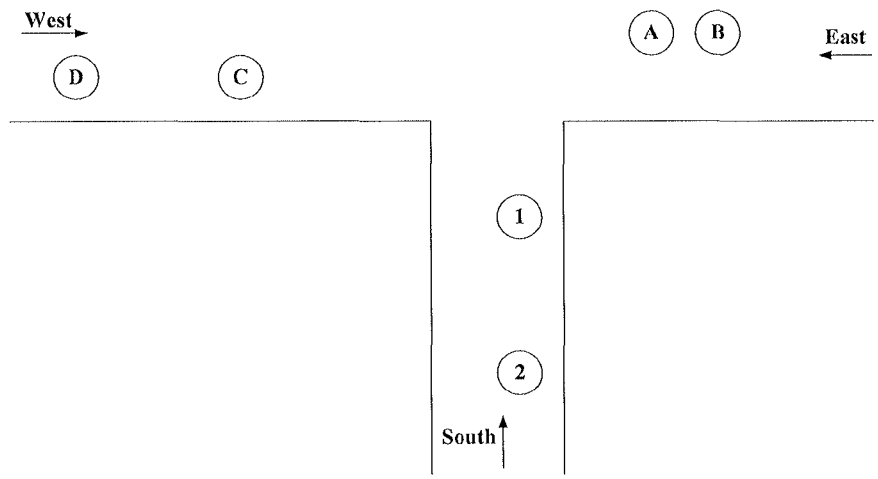

Fig.3

TRAFFIC CONTROL METHOD, NETWORK SIDE DEVICE AND TERMINAL

CROSS-REFERENCE TO RELATED APPLICATIONS

The present application is a national phase of PCT Application No. PCT/CN2014/095593 filed on Dec. 30, 2014, which claims a priority of the Chinese patent application No. 201310753059.3 filed with the Chinese State Intellectual Property Office on Dec. 31, 2013 and entitled "TRAFFIC CONTROL METHOD, NETWORK SIDE DEVICE AND TERMINAL", which are incorporated herein by reference in their entireties.

FIELD

The present disclosure relates to the field of communications technology, in particular to a traffic control method, a network side device and a terminal.

BACKGROUND

Along with the increase of vehicles on the roads, the traffic control at intersections becomes more and more important. Data released by the Ministry of Public Security in 2010 showed that, traffic accidents at the intersections, e.g., three-way or four-way intersections, accounted for 19% of the total traffic accidents.

Generally, a traffic light control system is provided at the intersection so as to control the traffic there. However, for the conventional traffic light control system, a large number of facilities need to be provided on ground. Due to the high facility cost and the maintenance cost, the traffic light control systems are merely widely provided for urban roads, and they are not widely provided for rural roads or intercity roads. In the case that the traffic light control system is not provided at the intersection, there will be a relatively high risk of traffic accidents.

In a word, there is a relatively high risk of traffic accidents at the intersection without any traffic light control system.

SUMMARY

The present disclosure provides a traffic control method, a network side device and a terminal, with which the risk of traffic accidents at an intersection without any traffic light control system can be reduced.

A traffic control method is provided for sending traffic control signals to vehicles which are to pass through an intersection, including steps of: receiving vehicle data of all vehicles on roads forming the intersection; matching position information of the vehicles in the vehicle data to road-network information, to establish a real-time matching relationship between the roads and the vehicles; generating traffic circulation information about the intersection in accordance with the vehicle data and the real-time matching relationship, and generating the traffic control signals corresponding to the vehicles in respective directions in accordance with the traffic circulation information; and sending the traffic control signals to the corresponding vehicles.

With the above technical solution, the vehicles moving toward the intersection in different directions may be determined in accordance with the vehicle data of the vehicles on the roads forming the intersection, and then the traffic control signals may be sent to the vehicles that meet a certain condition. As a result, it is able to control the vehicles moving toward the intersection without any traffic light control system, thereby reducing the risk of traffic accidents there.

Optionally, the step of matching the position information of the vehicles in the vehicle data to the road-network information to establish the real-time matching relationship between the roads and the vehicles includes: calculating an arrival time length to be spent by each vehicle to arrive at the intersection in accordance with the position information of the vehicle in the vehicle data and the road-network information; and dividing the vehicles on each road into vehicles in a first time region and vehicles in a second time region in accordance with the arrival time lengths.

Optionally, the step of dividing the vehicles on each road into the vehicles in the first time region and the vehicles in the second time region in accordance with the arrival time lengths includes: after it is determined that the traffic control signals need to be sent, determining the vehicles in the first time regions in each direction in accordance with a predetermined first time length, a predetermined first reference time length and the arrival time lengths, and determining the vehicles in the second time regions in each direction in accordance with current road-condition information, the first time length and the arrival time lengths. The step of sending the traffic control signals to the corresponding vehicles includes: sending traffic control signals to the vehicles in the first time regions in the respective directions, and sending traffic control signals to the vehicles in the second time regions in the respective directions. With respect to one direction, the traffic control signal sent to the vehicles in the first time regions in the one direction and a direction opposite to the one direction is different from the traffic control signal sent to the vehicles in the first time regions in the other directions, and the traffic control signal sent to the vehicles in the second time regions in the direction and a direction opposite to the direction is different from the traffic control signal sent to the vehicles in the second time regions in the other directions. In this way, it is able to send the traffic control signals to the vehicles in the first time regions and the second time regions in the respective directions simultaneously in the case that sending of the traffic control signals are triggered initially.

Optionally, the step of sending the traffic control signals to the corresponding vehicles includes: sending the traffic control signals to the vehicles in the first time regions and the second time regions in the respective directions in accordance with the current road-condition information and/or types of the vehicles in the first time regions and the second time regions. In this way, it is able to send appropriate traffic control signals to the vehicles in the first time regions and the second time regions in the respective directions.

Optionally, whether or not the traffic control signals need to be sent may be determined by steps of: with respect to one direction, determining a first arrival time length to be spent by each vehicle in a third time region in the one direction to arrive at the intersection and a first arrival time length to be spent by each vehicle in a third time region in a direction opposite to the one direction to arrive at the intersection, and determining second arrival time lengths to be spent by respective vehicles in third time regions in the other directions, the third time regions being determined in accordance with a predetermined second reference time length and the predetermined first reference time length, the second reference time length being longer than the first reference time length and shorter than the first time length; and determining, among all the first arrival time lengths and the second arrival time lengths, whether or not there are one first arrival time length and one second arrival time length, an absolute value of a difference between which is less than a predetermined safety time length, if yes, determining that the traffic control signals need to be sent, and otherwise, determining that the traffic control signals do not need to be sent. In this way, it is able to trigger sending of the traffic control signals to the vehicles in the case that there is a risk of traffic collision for the vehicles approaching the intersection.

Optionally, subsequent to the step of sending the traffic control signals to the vehicles in the first time regions and the second time regions in the respective directions, the method further includes: determining whether or not the traffic control signals need to be changed; determining vehicles in current first time regions in the respective directions in accordance with the time lengths corresponding to the previously-determined first time regions in the respective directions and the time lengths corresponding to the previously-determined second time regions in the respective directions, after it is determined that the traffic control signals need to be changed; determining vehicles in current second time regions in the respective directions in accordance with current road-condition information and the first time length; and sending the traffic control signals to the vehicles in the current second time regions in the respective directions, and returning to the step of determining whether or not the traffic control signals need to be changed. With respect to one direction, the traffic control signal sent to the vehicles in the current second time regions in the one direction and in a direction opposite to the one direction is different from the traffic control signal sent to the vehicles in the current second time regions in the other directions. In this way, it is able to send the traffic control signals to the vehicles subsequently moving toward the intersection after the traffic control signals have been sent to the vehicles initially.

Optionally, the step of determining whether or not the traffic control signals need to be changed includes: determining whether or not a second time length expires; if yes, determining that the traffic control signals need to be changed; and otherwise, determining that the traffic control signals do not need to be changed. The second time length is determined in accordance with the time lengths corresponding to the previously-determined first time regions. In this way, it is able to send the traffic control signals to the vehicles in the current second time regions after all the vehicles in the previously-determined first time regions pass through the intersection. Because the traffic control signals are sent in advance to the vehicles moving toward the intersection, sufficient response time is left for drivers, so as to reduce the risk of traffic accidents.

Optionally, subsequent to the step of determining the vehicles in the current second time regions in the respective directions, the method further includes: in the case that there is no vehicle in the second time regions to which a traffic control signal including a red light signal needs to be sent, returning to the step of determining whether or not the traffic control signals need to be changed after the vehicles in the current first time regions in the respective directions pass through the intersection. In this way, in the case that there are few vehicles on the roads, it is able to stop sending the traffic control signals to the vehicles.

A traffic control method is provided, including steps of: collecting vehicle data of vehicles, and sending the vehicle data to a network side device; and displaying a traffic light in accordance with a received traffic control signal from the network side device. In this way, it is able to report the vehicle data of the vehicles to the network side device, so that the network side device sends the traffic control signal to a vehicle that meets a certain condition in accordance with a moving condition of the vehicle.

Specifically, the step of displaying the traffic light in accordance with the received traffic control signal from the network side device includes: displaying a green light in response to a green light signal included in the traffic control signal, and displaying a red light in response to a red light signal included in the traffic control signal. In this way, it is able to display the traffic light in accordance with the traffic control signal, so as to instruct a driver to drive the vehicle as indicated by the traffic control signal.

Optionally, subsequent to the step of displaying the traffic light, the traffic control method further includes: displaying a switched traffic light after it is determined that the traffic light needs to be switched in accordance with time information included in the traffic control signal. In this way, after the red light signal has been received and it is determined that the traffic light needs to be switched, the green light may be displayed in accordance with the received time information, so as to prompt the driver that he may pass through an intersection.

A network side device is provided, including: a reception module used to receive vehicle data of all vehicles on roads forming an intersection; and a processing module used to, match position information about the vehicles in the vehicle data to road-network information to establish a real-time matching relationship between the roads and the vehicles, generate traffic circulation information about the intersection in accordance with the vehicle data and the real-time matching relationship, generate traffic control signals corresponding to the vehicles in respective directions in accordance with the traffic circulation information, and send the traffic control signals to the corresponding vehicles.

With such device, the vehicles moving toward the intersection in respective directions may be determined in accordance with the vehicle data of the vehicles on the roads forming the intersection, and then the traffic control signals may be sent to the vehicles that meet a certain condition. As a result, it is able to control the vehicles moving toward the intersection without any traffic light control system, thereby reducing the risk of traffic accidents there.

Optionally, the processing module is used to: calculate an arrival time length to be spent by each vehicle to arrive at the intersection in accordance with position information of the vehicle in the vehicle data and the road-network information, and divide the vehicles on each road into vehicles in a first time region and vehicles in a second time region in accordance with the arrival time lengths.

Optionally, the processing module is used to: determine the vehicles in the first time regions in the respective directions in accordance with a predetermined first time length, a predetermined first reference time length and the arrival time lengths and determine the vehicles in the second time regions in the respective directions in accordance with current road-condition information, the first time length and the arrival time lengths, after it is determined that the traffic control signals need to be sent; and send traffic control signals to the vehicles in the first time regions in the respective directions and send traffic control signals to the vehicles in the second time regions in the respective directions. With respect to one direction, the traffic control signal sent to the vehicles in the first time regions in the one direction and a direction opposite to the one direction is different from the traffic control signal sent to the vehicles in the first time regions in the other directions, and the traffic control signal sent to the vehicles in the second time regions in the direction and a direction opposite to the direction is different from the traffic control signal sent to the vehicles in the second time regions in the other directions. In this way, it is able to send the traffic control signals to the vehicles in the first time regions and the second time regions in the respective directions simultaneously in the case that sending of the traffic control signals to the vehicles is triggered initially.

Optionally, the processing module is used to: send the traffic control signals to the vehicles in the first time regions and the second time regions in the respective directions in accordance with the current road-condition information and/or types of the vehicles in the first time regions and the second time regions. In this way, it is able to send appropriate traffic control signals to the vehicles in the first time regions and the second time regions in the respective directions.

Optionally, the processing module is configured to determine whether or not the traffic control signals need to be sent by steps of: with respect to one direction, determining a first arrival time length to be spent by each vehicle in a third time region in the one direction to arrive at the intersection and a first arrival time length to be spent by each vehicle in a third time region in a direction opposite to the one direction to arrive at the intersection, and determining second arrival time lengths to be spent by respective vehicles in third time regions in the other directions to arrive at the intersection, where the third time regions are determined in accordance with a predetermined second reference time length and the predetermined first reference time length, the second reference time length is longer than the first reference time length and shorter than the first time length; and determining, among all the first arrival time lengths and all the second arrival time lengths, whether or not there are one first arrival time length and one second arrival time length, an absolute value of a difference between which is less than a predetermined safety time length; if yes, determining that the traffic control signals need to be sent; and otherwise, determining that the traffic control signals do not need to be sent. In this way, it is able to send the traffic control signals to the vehicles in the case that there is a risk of traffic collision for the vehicles approaching the intersection.

Optionally, the processing module is further used to: after the traffic control signals are sent to the vehicles in the first time regions and the second time regions in the respective directions, determine whether or not the traffic control signals need to be changed; after it is determined that the traffic control signals need to be changed, determine vehicles in current first time regions in the respective directions in accordance with the time lengths corresponding to the previously-determined first time regions in the respective directions and the time lengths corresponding to the previously-determined second time regions in the respective directions; determine vehicles in current second time regions in the respective directions in accordance with current road-condition information and the first time length; and send the traffic control signals to the vehicles in the current second time regions in the respective directions, and return to determine whether or not the traffic control signals need to be changed. With respect to one direction, the traffic control signal sent to the vehicles in the current second time regions in the one direction and in a direction opposite to the one direction is different from the traffic control signal sent to the vehicles in the current second time regions in the other directions. In this way, it is able to send the traffic control signals to the vehicles subsequently moving toward the intersection after the traffic control signals have been sent to the vehicles initially.

Optionally, the processing module is used to determine whether or not a second time length expires, if yes, determine that the traffic control signals need to be changed, and otherwise, determine that the traffic control signals do not need to be changed. The second time length is determined in accordance with the time lengths corresponding to the previously-determined first time regions. In this way, it is able to send the traffic control signals to the vehicles in the current second time regions after all the vehicles in the previously-determined first time regions pass through the intersection. Because the traffic control signals are sent in advance to the vehicles moving toward the intersection, sufficient response time is left for drivers, so as to reduce the risk of traffic accidents.

Optionally, the processing module is further used to, after the vehicles in the current second time regions in the respective directions are determined, in the case that there is no vehicle in the second time regions to which a traffic control signal including a red light signal needs to be sent, return to determine whether or not the traffic control signals need to be changed after the vehicles in the current first time regions in the respective directions pass through the intersection. In this way, in the case that there are few vehicles on the roads, it is able to stop sending the traffic control signals to the vehicles.

A terminal is provided, including a transmission module used to collect vehicle data of vehicles and send the vehicle data to a network side device, and a display module used to display a traffic light in accordance with a received traffic control signal from the network side device. In this way, it is able to report the vehicle data to the network side device, so that the network side device sends the traffic control signal to a vehicle that meets a certain condition in accordance with a moving condition of the vehicle.

Optionally, the display module is used to, display a green light in response to a green light signal included in the traffic control signal, and display a red light in response to a red light signal included in the traffic control signal. In this way, it is able to display the traffic light in accordance with the traffic control signal, so as to instruct a driver to drive the vehicle as indicated by the traffic control signal.

Optionally, the display module is used to display a switched traffic light after it is determined that the traffic light needs to be switched in accordance with time information included in the traffic control signal. In this way, after the red light signal has been received and it is determined that the traffic light needs to be switched, the green light may be displayed in accordance with the received time information, so as to prompt the driver that he may pass through an intersection.

BRIEF DESCRIPTION OF THE DRAWINGS

FIG. 2 is a detailed flow chart of the traffic control method according to the first embodiment of the present disclosure;

FIG. 3 is a schematic view showing a situation where vehicles are moving toward a four-way intersection from the east, the west, the north and the south;

DETAILED DESCRIPTION OF THE EMBODIMENTS

In technical solution of the present disclosure, vehicles moving toward an intersection in different directions are determined in accordance with vehicle data of the vehicles on respective roads forming the intersection, and traffic control signals are sent to the vehicles that meet a certain condition. As a result, it is able to control the vehicles moving toward the intersection without any traffic light control system, thereby reducing the risk of traffic accidents there.

It should be appreciated that, in the embodiments of the present disclosure, the intersection may be a four-way or three-way intersection. In the case that the intersection is a four-way one formed by four roads respectively extending to the east, the west, the north and the south, the vehicles may move toward the intersection in four directions, i.e., from the east, from the west, from the north and from the south. In the case that a direction pointing to the intersection from the east is selected, a direction opposite thereto refers to a direction pointing to the intersection from the west, and the other directions include a direction pointing to the intersection from the north and a direction pointing to the intersection from the south.

In the case that the intersection is a three-way one formed by three roads respectively extending to the east, the west and the south, the vehicles may move toward the intersection in three directions, e.g., from the east, from the west and from the south. In the case that a direction pointing to the intersection from the east is selected, a direction opposite thereto refers to a direction pointing to the intersection from the west, and the other direction is a direction pointing to the intersection from the south. In the case that there is no vehicle on a road extending in one direction, a time length to be spent by a vehicle on the road to arrive at the intersection is set as 0.

The present disclosure will be described hereinafter by taking a four-way intersection as an example, where a direction pointing to the intersection from the east is selected, a direction opposite thereto refers to a direction pointing to the intersection from the west to, and other directions include a direction pointing to the intersection from the north and a direction pointing to the intersection from the south.

First Embodiment

Figure 1:
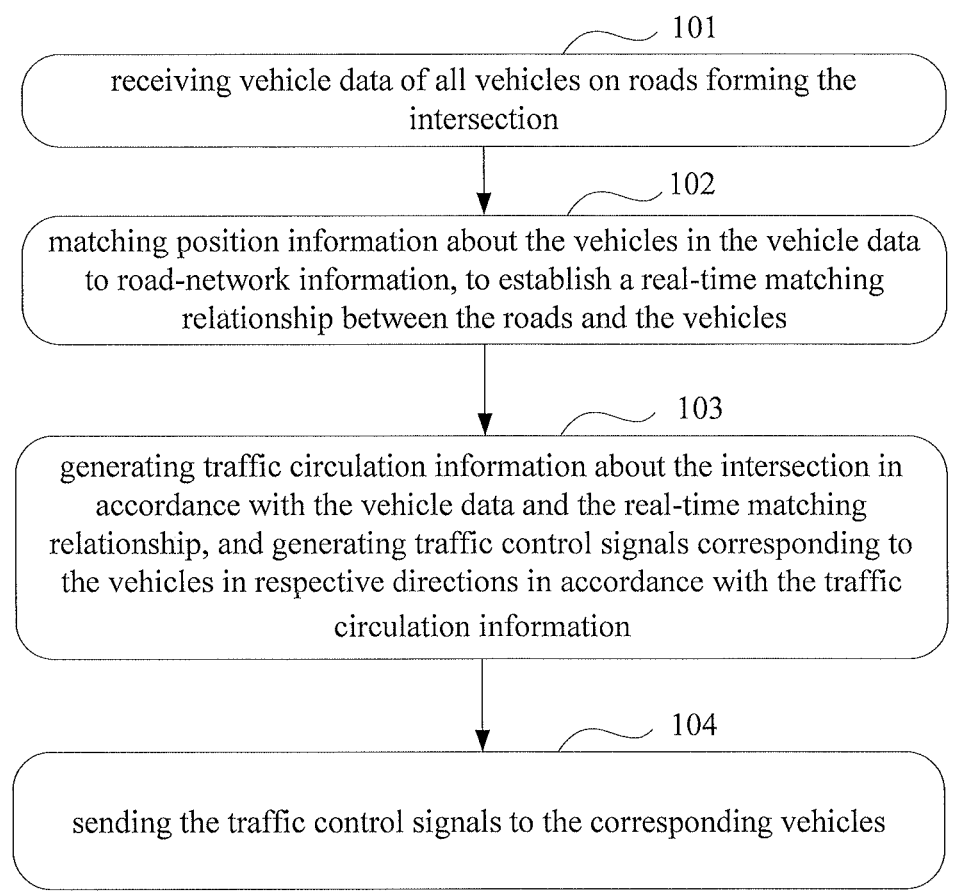
FIG. 1 is a flow chart of a traffic control method according to a first embodiment of the present disclosure.

As shown in FIG. 1, the present disclosure provides in the first embodiment a traffic control method, including: Step 101 of receiving vehicle data of all vehicles on roads forming the intersection; Step 102 of matching position information about the vehicles in the vehicle data to road-network information, to establish a real-time matching relationship between the roads and the vehicles; Step 103 of generating traffic circulation information about the intersection in accordance with the vehicle data and the real-time matching relationship, and generating traffic control signals corresponding to the vehicles in respective directions in accordance with the traffic circulation information; and Step 104 of sending the traffic control signals to the corresponding vehicles.

The vehicle data of a vehicle may include a part of, or all of, position information, speed information, moving direction information of the vehicle. The road on which a vehicle moves and a distance between the vehicle and the intersection may be determined in accordance with the position information and road information of the vehicle. Whether or not a vehicle is moving toward the intersection may be determined in accordance with the moving direction information of the vehicle. A time length to be spent by a vehicle to arrive at the intersection can be determined in accordance with the position information and the speed information of the vehicle.

The position information of the vehicle may include longitude and latitude information as well as elevation information, which may be acquired by an on-board satellite positioning system (e.g., a Global Positioning System or Beidou Positioning System).

The speed information and the moving direction information of the vehicle may be acquired via an on-board Telematics Control Unit (TCU), or acquired from an on-board Controller Area Network (CAN) bus via an Electronic Control Unit (ECU) through an On-Board Diagnostics (OBD) interface, or acquired from an on-board satellite positioning system or a three-dimensional acceleration sensor.

It should be appreciated that, in the first embodiment, the traffic control method may be executed by a network side device (e.g., a server), and the vehicle data of a vehicle may be read by a terminal installed on the vehicle and periodically (e.g., every two seconds) reported, by the terminal, to the network side device. The network side device acquires the vehicle data of the vehicles and determines vehicles moving toward the intersection in different directions, generates the traffic control signals in accordance with the traffic circulation information (e.g., vehicle volume information) about the vehicles in different directions, and sends the traffic control signals to corresponding vehicles.

In Step 101, all vehicles on respective roads forming the intersection include the vehicles moving toward the intersection in respective directions.

In Step 102, the road-network information is just the road information, for example, the number of the road, e.g., National Highway No. 101 (G101). After the acquisition of the position information of a vehicle, it is able to determine the road on which the vehicle moves and a specific position of the vehicle on the road, thereby determining the matching relationship between the roads and the vehicles. Because the position of each vehicle is changed during the movement, the matching relationship between the roads and the vehicles varies with time.

To be specific, Step 102 may include calculating an arrival time length to be spent by each vehicle to arrive at the intersection in accordance with the position information of the vehicle in the vehicle data and the road-network information, and dividing the vehicles on each road into vehicles in a first time region and vehicles in a second time region in accordance with the arrival time lengths.

The way for sending the traffic control signals to the vehicles (i.e., Steps 102 and 103) will be described in detail hereinafter.

As shown in FIG. 2, the traffic control method in the first embodiment of the present disclosure further includes following Steps 201 and 202. In Step 201, after it is determined that the traffic control signals need to be sent, the vehicles in the first time region in each direction are determined in accordance with a predetermined first time length, a predetermined first reference time length and the arrival time lengths, and the vehicles in the second time region in each direction are determined in accordance with current road-condition information, the first time length and the arrival time lengths. In Step 202, traffic control signals are sent to the vehicles in the first time regions in the respective directions, and traffic control signals are sent to the vehicles in the second time regions in the respective directions.

To be specific, after the acquisition of the vehicle data of all the vehicles on the roads forming the intersection and the determination of the vehicles moving toward the intersection in different directions, whether or not the traffic control signals need to be sent may be determined with the followings steps.

In Step 1, with respect to one direction, a first arrival time length to be spent by each vehicle in a third time region in the one direction to arrive at the intersection and a first arrival time length to be spent by each vehicle in a third time region in a direction opposite to the one direction to arrive at the intersection are determined, and second arrival time lengths to be spent by respective vehicles in third time regions in the other directions to arrive at the intersection are determined.

In Step 2, it is determined, among all the first arrival time lengths and all the second arrival time lengths, whether or not there are one first arrival time length and one second arrival time length, an absolute value of a difference between which is less than a predetermined safety time length; if yes, it is determined that the traffic control signals need to be sent; otherwise, it is determined that the traffic control signals do not need to be sent.

In Step 1, the third time region is determined in accordance with a predetermined second reference time length and the predetermined first reference time length, and the second reference time length is longer than the first reference time length and shorter than the predetermined first time length. To be specific, with respect to one direction, the third time region in the one direction is a region between a vehicle closest to the intersection and a vehicle farthest from the intersection among the vehicles which are to spend, from the current moment, time lengths ranging from the first reference time length to the second reference time length to arrive at the intersection.

For example, in the case that the first reference time length is 5 s and the predetermined second reference time length is 20 s, the third time region in the direction is a region between the vehicle closest to the intersection and the vehicle farthest from the intersection among the vehicles which are to spend, from the current moment, time lengths ranging from 5 s to 20 s to arrive at the intersection.

Since the vehicles closest to the intersection in the third time regions in respective directions may be away from the intersection by different distances and the vehicles farthest from the intersection in the third time regions in respective directions may be away from the intersection by different distances too, the third time regions in different directions may be of different sizes.

Through setting the second reference time length and the first reference time length, it is able to accurately determine, in accordance with information of vehicles approaching the intersection, whether or not the traffic control signals need to be sent.

Taking a direction pointing to the intersection from the east as an example, in Step 1, the first arrival time lengths refer to time lengths to be spent by respective vehicles in the third time regions in east-west directions (i.e., the direction pointing to the intersection from the east and a direction pointing to the intersection from the west) to arrive at the intersection, and the second arrival time lengths refer to time lengths to be spent by respective vehicles in the third time regions in north-south directions (i.e., a direction pointing to the intersection from the south and a direction pointing to the intersection from the north) to arrive at the intersection.

FIG. 3 shows a situation where the vehicles are moving toward the intersection from the east, the west, the north and the south. Vehicles A and B are moving toward the intersection from the east, vehicles C and D are moving toward the intersection from the west, vehicles 1 and 2 are moving toward the intersection from the south, and vehicles 3 and 4 are moving toward the intersection from the north.

In the case that the vehicle A will spend 10 s from the current moment to arrive at the intersection, the vehicle B will spend 20 s from the current moment to arrive at the intersection, the vehicle C will spend 25 s from the current moment to arrive at the intersection, the vehicle D will spend 45 s from the current moment to arrive at the intersection, the vehicle 1 will spend 13 s from the current moment to arrive at the intersection, the vehicle 2 will spend 35 s from the current moment to arrive at the intersection, the vehicle 3 will spend 25 s from the current moment to arrive at the intersection and the vehicle 4 will spend 40 s from the current moment to arrive at the intersection, the first arrival time lengths include 10 s and 20 s, and the second arrival time length includes 13 s.

In Step 2, the predetermined safety time length may be half of a time length spent by a vehicle to pass through the intersection, e.g., 5 s. At this time, in Step 1, an absolute value of a difference between the first arrival time length (10 s) to be spent by the vehicle A to arrive at the intersection and the second arrival time length (13 s) to be spent by the vehicle 1 to arrive at the intersection is less than the predetermined safety time length (5 s), so the vehicle A and the vehicle 1 may collide with each other at the intersection. At this time, it is determined that the traffic control signals need to be sent (i.e. the sending of the traffic control signals to the vehicles is triggered), so as to prevent traffic accident at the intersection.

After it is determined that the traffic control signals need to be sent, the vehicles in the first time regions in respective directions are determined in accordance with the predetermined first time length, the predetermined first reference time length and the arrival time lengths, and the vehicles in the second time regions in respective directions are determined in accordance with current road condition information, the predetermined first time length and the arrival time lengths. Then, the traffic control signals are sent to the vehicles in the first time regions and the second time regions in respective directions.

In each direction, the second time region is located behind the first time region. With respect to one direction, the traffic control signal sent to the vehicles in the first time regions in the one direction and a direction opposite to the one direction is different from the traffic control signal sent to the vehicles in the first time regions in the other directions, and the traffic control signal sent to the vehicles in the second time regions in the one direction and a direction opposite to the one direction is different from the traffic control signal sent to the vehicles in the second time regions in the other directions.

To be specific, in determining the first time region for the first time, with respect to one direction, a region between a vehicle closest to the intersection and a vehicle farthest from the intersection among the vehicles which are to spend, from the current moment, time lengths ranging from the determined first reference time length to the determined first time length to arrive at the intersection is determined as the first time region.

For example, in the case that the predetermined first reference time length is 5 s and the predetermined first time length is 30 s, the initially-determined first time region in the direction refers to a region between the vehicle closest to the intersection and the vehicle farthest from the intersection among the vehicles which are to spend, from the current moment, time lengths ranging from 5 s to 30 s to arrive at the intersection. That is, the first time region in the direction refers to a region between the vehicle closest to the intersection and the vehicle farthest from the intersection among the vehicles which will arrive at the intersection in 5 s to 30 s.

For ease of description, a lower bound of a time length range for the first time region is called as a starting time length for the first time region, and an upper bound of the time length range for the first time region is called as an ending time length for the first time region. For example, with respect to one direction, in the case that the first time region in the one direction is a region between the vehicle closest to the intersection and the vehicle farthest from the intersection among the vehicles which are to spend, from the current moment, time lengths ranging from 5 s to 30 s to arrive at the intersection, the starting time length for the first time region is 5 s, and the ending time length for the first time region is 30 s.

Since the vehicles closest to the intersection in the first time regions in respective directions may be away from the intersection by different distances and the vehicles farthest from the intersection in the third time regions in respective directions may be away from the intersection by different distances too, the first time regions in different directions may be of different sizes.

After the first time regions in different directions are determined for the first time, traffic control signals to be sent to the vehicles in the first time regions in respective directions may be determined in accordance with current road condition information and/or types of the vehicles in the respective regions.

It should be appreciated that, the traffic control signal in the embodiments includes a traffic light signal and time information about a switching of the traffic light signal. The traffic light signal may be a green light signal or a red light signal. In other words, the traffic control signal in the embodiments may be a signal including a red light signal and time information about a switching from the red light signal to a green light signal, or may be a signal including a green light signal and time information about a switching from the green light signal to a red light signal.

To be specific, with respect to a situation where the traffic control signals are sent to the vehicles for the first time, the vehicles in the first time regions in two directions to which the red light signal is to be sent and the vehicles in the first time regions in the other two directions to which the green light signal is to be sent may be determined in the following two modes.

Mode 1

With respect to one direction, in the case that a sum of expected waiting time lengths of the vehicles in the first time regions in the one direction and a direction opposite thereto is greater than a sum of expected waiting time lengths of the vehicles in the first time regions in the other directions, it is determined that the green light signal is to be sent to the vehicles in the first time regions in the direction and the direction opposite thereto, and the red light signal is to be sent to the vehicles in the first time regions in the other directions; alternatively, in the case that a sum of the expected waiting time lengths of the vehicles in the first time regions in the direction and a direction opposite thereto is not greater than a sum of the expected waiting time lengths of the vehicles in the first time regions in the other directions, the network side device may determine that the red light signal is to be sent to the vehicles in the first time regions in the direction and the direction opposite thereto, and the green light signal is to be sent to the vehicles in the first time regions in the other directions. The expected waiting time length of each vehicle is a difference between the predetermined first time length and a time length to be spent by the vehicle to arrive at the intersection.

In other words, in the case that the sum of the expected waiting time lengths of the vehicles in the first time regions in two opposite directions is of a larger value, the green light signal is to be sent to the vehicles in the first time regions in these two opposite directions, and the red light signal is to be sent to the vehicles in the first time regions in the other two directions, so as to reduce the overall waiting time lengths for all the vehicles on the roads as possible. A red/green light duration of the initially-determined first time regions is equal to the predetermined first time length (e.g., 30 s).

Taking the situation in FIG. 3 as an example, the sending of the traffic control signals to the vehicles is triggered for the first time, so at this time, none of the eight vehicles has received any traffic control signal. In the east-west directions, vehicles A, B and C will arrive at the intersection in 5 s to 30 s, and in the north-south directions, vehicles 1 and 3 will arrive at the intersection in 5 s to 30 s. Hence, the vehicles in the first time regions in the east-west directions include the vehicles A, B and C, and the vehicles in the first time regions in the north-south directions include the vehicles 1 and 3.

The sum of the expected waiting time lengths of the vehicles A, B and C in the east-west directions is (30 s−8 s)+(30 s−20 s)+(30 s−25 s)=37 s, and the sum of the expected waiting time lengths of the vehicles 1 and 3 in the north-south directions is (30 s−6 s)+(30 s−25 s)=29 s, i.e., the sum of the expected waiting time lengths of the vehicles in the first time regions in the east-west directions is greater than the sum of the expected waiting time lengths of the vehicles in the first time regions in the north-south directions. At this time, the network side determines that the green light signal is to be sent to the vehicles (vehicles A, B and C) in the first time regions in the east-west directions, and the red light signal is to be sent to the vehicles (vehicles 1 and 3) in the first time regions in the north-south directions.

It should be appreciated that, in order to prevent rear-end collision, apart from sending the red light signal to the vehicles 1 and 3, a prompt signal may be sent to the vehicles in the north-south directions that are to spend time lengths ranging from 30 s to 35 s to arrive at the intersection, e.g., vehicle 2, so as to prompt the vehicles to slow down.

Mode 2

With respect to one direction, in the case that the vehicles in the first time regions in the one direction and a direction opposite thereto include a special vehicle, the network side device may determine that the green light signal is to be sent to the vehicles in the first time regions in the one direction and the direction opposite thereto, and the red light signal is to be sent to the vehicles in the first time regions in the other directions; alternatively, in the case that the vehicles in the first time regions in the other directions include a special vehicle, the network side device may determine that the red light signal is to be sent to the vehicles in the first time regions in the one direction and the direction opposite thereto, and the green light signal is to be sent to the vehicles in the first time regions in the other directions.

In other words, in the case that the vehicles in the first time regions in two opposite directions include a special vehicle (e.g., a fire truck or an ambulance), the green light signal may be sent to the vehicles in the first time regions in these two directions, and the red light signal may be sent to the vehicles in the first time regions in the other two directions, so as to ensure the priority of the special vehicle. In the case that the vehicles in the first time regions in the four directions include no special vehicle, the traffic control signals may be determined as that in mode 1.

It should be appreciated that, with respect to the situation where the traffic control signals are sent to the vehicles for the first time, mode 2 may be selected at first, so as to determine the vehicles in the first time regions in two directions to which the red light signal is to be sent and the vehicles in the first time regions in the other two directions to which the green light signal is to be sent. In the case that mode 2 cannot be used for determination, mode 1 may be selected.

The vehicles in the second time regions in respective directions may be determined in accordance with the current road condition information, the predetermined first time length and the arrival time lengths, while determining, for the first time, the vehicles in the first time regions in two directions to which the red light is to be sent and the vehicles in the first time regions in the other two directions to which the green light signal is to be sent in the above-mentioned mode 1 and/or mode 2.

To be specific, the vehicles in the second time regions may be determined as follows.

With respect to one direction, in the case that the traffic light signal sent to the vehicles in the first time regions in the one direction and a direction opposite thereto is predetermined as the green light signal (i.e., in the above-mentioned mode 1 and/or mode 2), it is to determine whether or not a sum of the expected waiting time lengths of the vehicles in predetermined ranges behind the first time regions in the one direction and the direction opposite thereto (e.g., the vehicles that are to spend time lengths ranging from 30 s to 60 s to arrive at the intersection) is greater than a predetermined waiting time length threshold (e.g., 500 s). If yes, the predetermined ranges may be gradually narrowed, until the sum of the expected waiting time lengths of the vehicles in the predetermined ranges is not greater than the predetermined waiting time length threshold, and the latest predetermined ranges in which the vehicles have their expected waiting time lengths in sum greater than the predetermined waiting time length threshold are taken as the second time regions. Otherwise, a sum of the ending time length for the first time region and the predetermined first time length is taken as an ending time length for the second time region. At this time, with respect to one direction, the second time region refers to a region between a vehicle closest to the intersection and a vehicle farthest from the intersection among the vehicles which are located in a region behind the first time region in the direction and are to spend time lengths ranging from the ending time length for the first time region to the ending time length for the second time region to arrive at the intersection.

Since the vehicles closest to the intersection in the second time regions in respective directions may be away from the intersection by different distances and the vehicles farthest from the intersection in the second time regions in respective directions may be away from the intersection by different distances too, the second time regions in respective directions may be of different sizes.

Taking the situation in FIG. 3 as an example, in the case that, as determined in the above-mentioned mode 1 and/or mode 2, the green light signal is to be sent to the vehicles in the first time regions in the east-west directions (including vehicles A, B and C) and the red light signal is to be sent to the vehicles in the first time regions in the north-south directions (including vehicles 1 and 3), it is to determine whether or not a sum of the expected waiting time lengths of the vehicles, which are located behind the first time regions in the east-west directions and which are to spend time lengths ranging from 30 s (the ending time length for the first time region) to 60 s (a sum of the ending time length for the first time region and the predetermined first time length) to arrive at the intersection, is greater than 500 s. If yes, it is further determined whether or not a sum of the expected waiting time lengths of the vehicles, which are located behind the first time regions in the east-west directions and which are to spend time lengths ranging from 30 s to 59 s to arrive at the intersection, is greater than 500 s. If yes, it is further determined whether or not a sum of the expected waiting time lengths of the vehicles, which are located behind the first time regions in the east-west directions and which are to spend time lengths ranging from 30 s to 58 s to arrive at the intersection, is greater than 500 s, and so on. With respect to a vehicle of the vehicles which are located behind the first time regions in the east-west directions and which are to spend time lengths ranging from 30 s to 60 s to arrive at the intersection, in the case that the time length to be spent by the vehicle to arrive at the intersection is 50 s, the expected waiting time length of the vehicle is 60 s−50 s=10 s.

In the case that the sum of the expected waiting time lengths of the vehicles which are located behind the first time regions in the east-west directions and which are to spend, from the current moment, time lengths ranging from 30 s to 50 s to arrive at the intersection is greater than 500 s and meanwhile the sum of expected waiting time lengths of the vehicles which are located behind the first time regions in the east-west directions and which are to spend, from the current moment, time lengths ranging from 30 s to 49 s to arrive at the intersection is less than 500 s, it may be determined that the ending time length for the second time region and the red/green light duration are each 50 s. With respect to one direction, the second time region in the one direction refers to a region between a vehicle closest to the intersection and a vehicle farthest from the intersection among the vehicles which are located behind the first time region in the direction and which are to spend, from the current moment, time lengths ranging from 30 s to 50 s to arrive at the intersection. In the case that the sum of the expected waiting time lengths of the vehicles which are located behind the first time regions in the east-west directions and which are to spend, from the current moment, time lengths ranging from 30 s to 60 s to arrive at the intersection is not greater than 500 s, it may be determined that the ending time length and the red/green light duration for the second time region are each 60 s. With respect to one direction, the second time region in the one direction refers to a region between a vehicle closest to the intersection and a vehicle farthest from the intersection among the vehicles which are located behind the first time region in the direction and which are to spend, from the current moment, time lengths ranging from 30 s to 60 s to arrive at the intersection.

It should be appreciated that, in order to prevent the frequent switching between the red light signal and the green light signal in one direction, in the case that a difference between the determined ending time length for the second time region and the ending time length for the first time region is less than a predetermined safety duration (e.g., 5 s), the ending time length for the second time region may be set as a sum of the ending time length for the first time region and the predetermined safety duration. For example, in the case that the ending time length for the initially-determined first time region is 30 s and the ending time length for the initially-determined second time region is 33 s, the ending time length for the second time region may be set as 35 s.

Figure 4A:
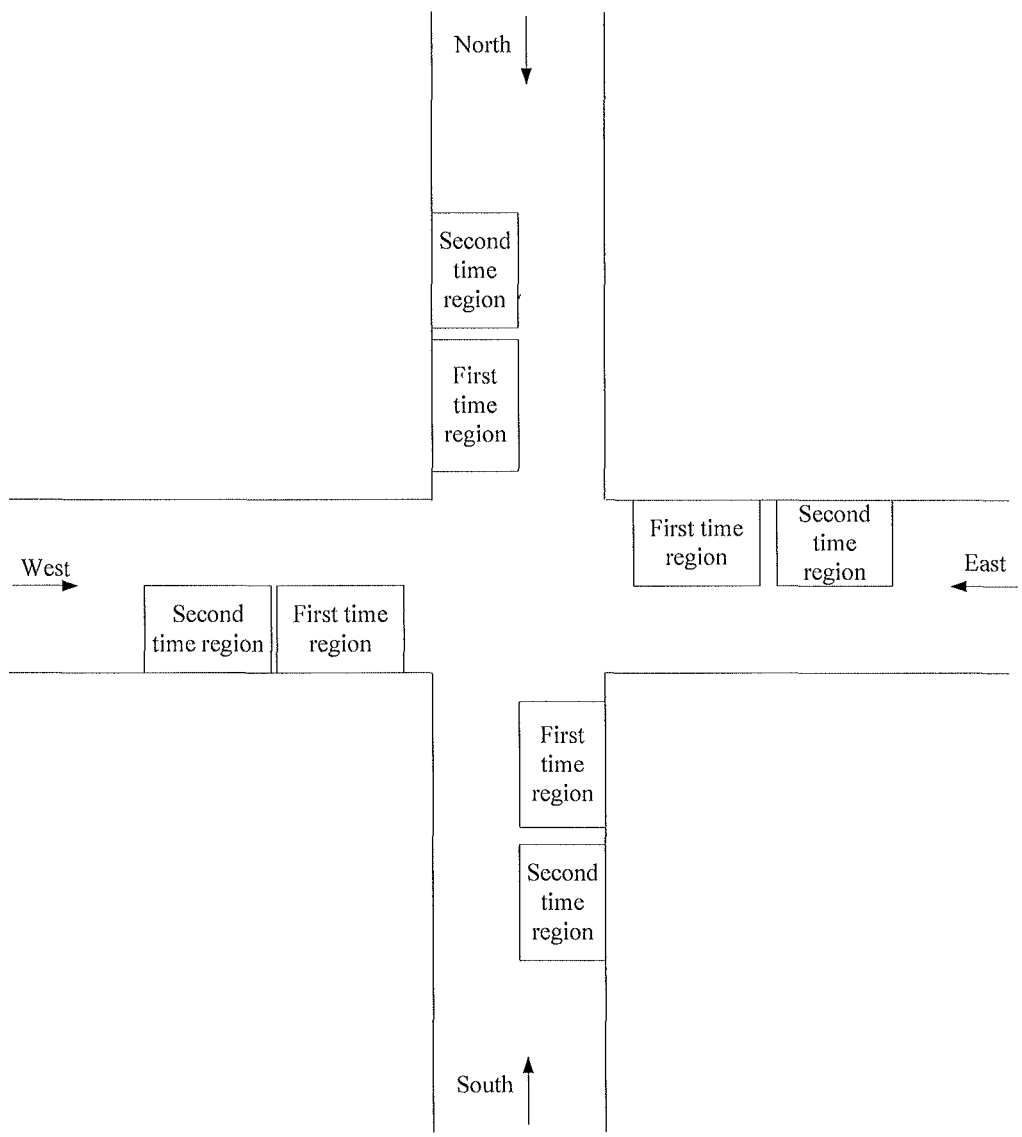
FIG. 4a is a schematic view showing first time regions and second time regions initially determined in directions respectively pointing to the intersection from the east, the west, the north and the south.

FIG. 4a shows the initially-determined first time regions and second time regions in the east-west directions and the north-south directions, where the starting time length for each first time region is 5 s, the ending time length for each first time region is 30 s, the starting time length for each second time region is 30 s, and the ending time length for each second time region is 50 s.

In the case that the green light signal needs to be sent to the vehicles in the first time regions in the east-west directions and the red light signal needs to be sent to the vehicles in the first time regions in the north-south directions, after the determination of the vehicles in the second time regions in different directions, whether or not the vehicles in the second time regions in the east-west directions include any special vehicle (e.g., a fire truck or an ambulance) may be determined at first. In the case that the vehicles include no special one, it may be determined that the green light signal is to be sent to the vehicles in the first time regions in the east-west directions and the red light signal is to be sent to the vehicles in the first time regions in the north-south directions (the red/green light duration is 30 s), and the red light signal is to be sent to the vehicles in the second time regions in the east-west directions and the green light signal is to be sent to the vehicles in the second time regions in the north-south directions (the red/green light duration is 50 s).

Each traffic control signal includes the traffic light signal (the red light signal or the green light signal) and time information about the switching of the traffic light signal. The time information about the switching of the traffic light signal may be the red/green light duration, or a time instant at which the traffic light signal switches.

For example, it is assumed that a current time instant is 10:30:00, and a vehicle D moving from the west toward the intersection will spend 45 s to arrive at the intersection. The vehicle D is located in the second time region in the east-west direction and the red/green light duration of the second time region is 50 s. Accordingly, the red light signal and the red/green light duration of 50 s may be sent to the vehicle D, or the red light signal and a time instant 10:30:50 at which the red light signal is to be switched into the green light signal may be sent to the vehicle D.

In the case that a terminal in the vehicle D has received the red light signal and the red/green light duration of 50 s, it may switch the red light signal into the green light signal after the red/green light duration expires, so as to instruct the driver to pass through the intersection. In the case that the terminal in vehicle D has received the red light signal and the time instant 10:30:50 at which the red light signal is to be switched into the green light signal, it may switch the red light signal into the green light signal at the time instant 10:30:50, so as to instruct the driver to pass through the intersection.

For another example, it is assumed that a current time instant is 10:30:00, and a vehicle B moving from the east toward the intersection will spend 20 s to arrive at the intersection. The vehicle B is located in the first time region in the east-west direction and the red/green light duration of the first time region is 30 s. Accordingly, the green light signal and the red/green light duration of 30 s may be sent to the vehicle B, or the red light signal and a time instant 10:30:30 at which the green light signal is to be switched into the red light signal may be sent to the vehicle B. In the case that vehicle B does not pass through the intersection after it has received the green light signal for 30 s, a message for requesting a resending of a traffic control signal may be sent by the vehicle B. Upon the receipt of the message, a time instant 10:30:50 at which the green light signal is to be switched into the red light signal may be sent to the vehicle B.

It should be appreciated that, in order to prevent the vehicles from counting the red/green light duration asynchronously due to the delay of sending the red/green light duration to different vehicles, preferably, the time instant at which the traffic light signal switches may be sent to the vehicles, so as to ensure that different vehicles are informed of the same time instant at which traffic light signal switches.

Specially, in the case that the vehicles in the second time regions in the east-west directions currently include a special vehicle, it is further determined whether or not the vehicles in the east-west directions which are to spend, from the current moment, time lengths ranging from 50 s (the ending time length for the second time region) to 80 s (a sum of the ending time length for the second time region and the predetermined first time length) to arrive at the intersection include a special vehicle. If yes, it is further determined whether or not the vehicles in the east-west directions which are to spend, from the current moment, time lengths ranging from 80 s to 110 s to arrive at the intersection include a special vehicle, and so on.

Figure 4B:
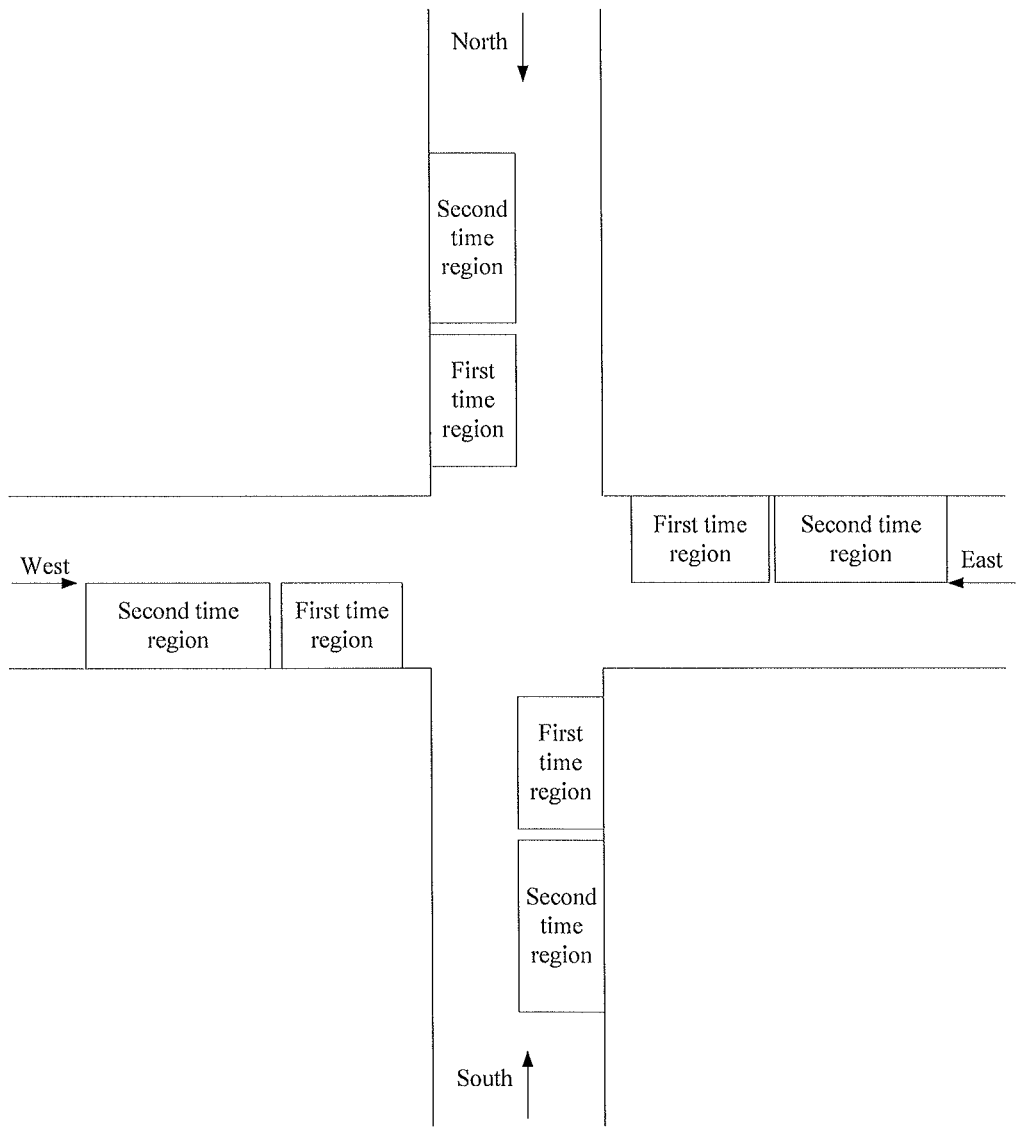
FIG. 4b is another schematic view showing first time regions and second time regions initially determined in directions respectively pointing to the intersection from the east, the west, the north and the south.

In the case that the vehicles in the east-west directions which are to spend, from the current moment, time lengths ranging from 50 s to 80 s to arrive at the intersection include a special vehicle while the vehicles in the east-west directions which are to spend, from the current moment, time lengths ranging from 80 s to 110 s to arrive at the intersection do not include any special vehicle, the green light signal may be sent to the vehicles in the east-west directions which are to spend, from the current moment, time lengths ranging from 50 s to 80 s to arrive at the intersection, and the red light signal may be sent to the vehicles in the north-south directions which are to spend, from the current moment, time lengths ranging from 50 s to 80 s to arrive at the intersection (the red/green light duration is 80 s). At this time, with respect to one direction, the first time region in the one direction refers to a region between a vehicle closest to the intersection and a vehicle farthest from the intersection among the vehicles in the direction which are to spend, from the current moment, time lengths ranging from 5 s to 30 s to arrive at the intersection, and the second time region in the direction refers to a region between a vehicle closest to the intersection and a vehicle farthest from the intersection among the vehicles in the direction which are located behind the first time region and which are to spend, from the current moment, time lengths ranging from 30 s to 80 s to arrive at the intersection, as shown in FIG. 4b.

How to determine whether or not the traffic control signals need to be sent, how to determine the vehicles in the first time regions and the second time regions in different duration in the case that the traffic control signals need to be sent to the vehicles for the first time, and how to determine the traffic control signals to be sent to the vehicles in different regions have been described hereinafter. After the traffic control signals have been sent to the vehicles for the first time, the ways of sending traffic control signals to the vehicles that are moving toward the intersection subsequently will be described hereinafter.

After the traffic control signals have been sent to the vehicles in the first time regions and the second time regions for the first time, traffic control signals may be sent to the vehicles that are moving toward the intersection subsequently in accordance with the road-condition information and/or the types of the vehicles.

Figure 5:
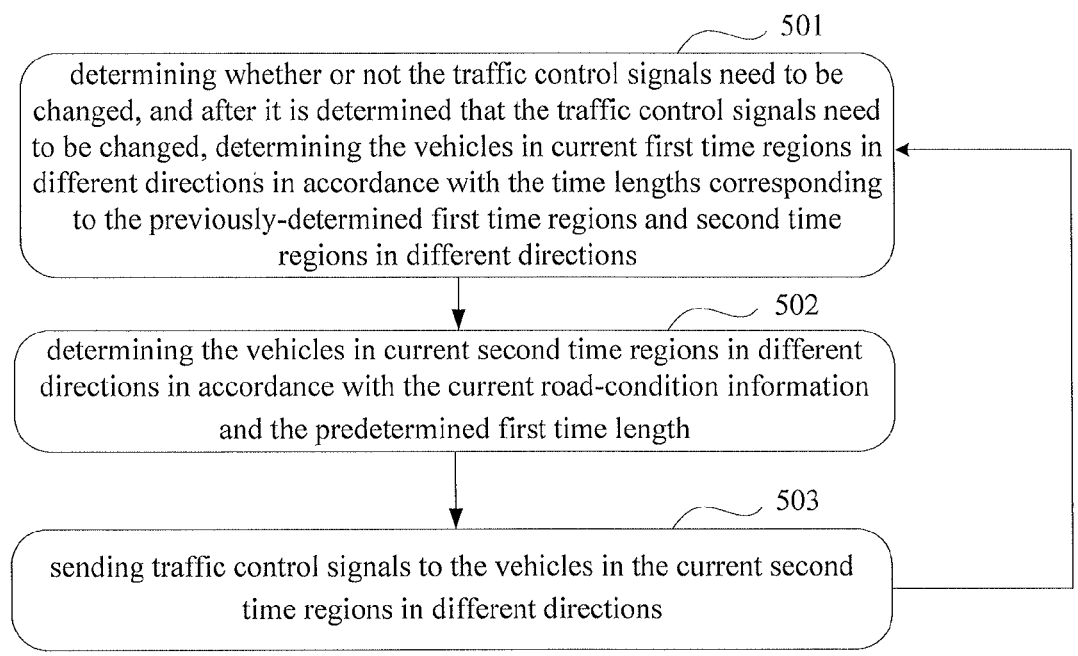
FIG. 5 is a schematic view showing steps after traffic control signals are initially sent to vehicles in the first time regions and the second time regions in respective directions according to the first embodiment of the present disclosure.

To be specific, as shown in FIG. 5, after the traffic control signals have been sent to the vehicles in the first time regions and the second time regions in different directions for the first time, the traffic control method further includes the following steps 501-503.

Step 501 includes: determining whether or not the traffic control signals need to be changed, and after it is determined that the traffic control signals need to be changed, determining the vehicles in current first time regions in different directions in accordance with the time lengths corresponding to the previously-determined first time regions in different directions and the time lengths corresponding to the previously-determined second time regions in different directions.

Step 502 includes: determining the vehicles in current second time regions in different directions in accordance with the current road-condition information and the predetermined first time length.

Step 503 includes: sending traffic control signals to the vehicles in the current second time regions in different directions, and returning to step 501.

In step 501, the determining whether or not the traffic control signals need to be changed includes: determining whether or not a second time length expires; if yes, determining that the traffic control signals need to be changed; otherwise, determining that the traffic control signals do not need to be changed. The second time length is determined in accordance with the time lengths corresponding to the previously-determined first time regions.

To be specific, the second time length may be set equal to the ending time length for the previously-determined first time regions. In addition, a timer for the second time length is started simultaneously when sending traffic control signals to the vehicles in the previously-determined second time regions. Since the second time length is set equal to the ending time length for the previously-determined first time regions, second time lengths determined at different times may be different from each other.

For example, the first time regions and the second time regions in different directions in FIG. 4a are previously determined and the ending time length for the previously-determined first time regions is 30, the second time length is 30 s. In addition, the timer for the second time length is started simultaneously when sending traffic control signals to the vehicles in the previously-determined second time regions. In other words, after 30 s elapse from the moment of sending the traffic control signals to the vehicles in the previously-determined second time regions, the vehicles in the previously-determined second time regions become the vehicles in the current first time regions.

To be specific, the ending time length for the current first time regions is a difference between the ending time length for the previously-determined second time regions and the ending time length for the previously-determined first time regions, and the starting time length for the current first time regions is 0 s.

For example, the first time regions and the second time regions in different directions in FIG. 4a are previously determined, the ending time length for the previously-determined first time regions is 30 s and the ending time length for the previously-determined second time regions is 50 s, the ending time length for the current first time regions is 20 s and the starting time length for the current first time regions is 0 s.

After the second time length expires (e.g., after 30 s elapse), with respect to one direction, the current first time region in the one direction refers to a region between a vehicle closest to the intersection and a vehicle farthest from the intersection among the vehicles which are to spend, from the current moment, time lengths ranging from 0 s to 20 s to arrive at the intersection.

In Step 502, each second time region is located behind the corresponding first time region. The vehicles in the current second time regions in different directions may be determined in accordance with the current road-condition information and the predetermined first time length in the following ways.

For example, the first time regions and the second time regions in different directions in FIG. 4a are previously determined and after 30 s (i.e., the second time length), the traffic light signal sent to the vehicles in the current first time regions in the north-south directions (i.e., the previously-determined second time regions) is the green light signal, it is to determine whether or not a sum of expected waiting time lengths of the vehicles, which are located behind the current first time regions in the north-south directions and which are to spend, from the current moment, time lengths ranging from 20 s (the ending time length for the current first time regions) to 50 s (a sum of the ending time length for the current first time regions and the predetermined first time length) to arrive at the intersection, is greater than 500 s. If yes, it is further determined whether or not a sum of the expected waiting time lengths of the vehicles, which are located behind the current first time regions in the north-south directions and which are to spend, from the current moment, time lengths ranging from 20 s to 49 s to arrive at the intersection, is greater than 500 s. If yes, it is further determined whether or not a sum of the expected waiting time lengths of the vehicles, which are located behind the current first time regions in the north-south directions and which are to spend, from the current moment, time lengths ranging from 20 s to 48 s to arrive at the intersection, is greater than 500 s, and so on. With respect to a vehicle among the vehicles which are located behind the current first time regions in the north-south directions and which are to spend time lengths ranging from 20 s to 50 s to arrive at the intersection, in the case that the vehicle will spend 35 s to arrive at the intersection, the expected waiting time length of the vehicle is 50 s−35 s=15 s.

In the case that the sum of the expected waiting time lengths of the vehicles which are located behind the current first time regions in the north-south directions and which are to spend, from the current moment, time lengths ranging from 20 s to 40 s to arrive at the intersection is greater than 500 s and meanwhile the sum of expected waiting time lengths of the vehicles which are located behind the current first time regions in the north-south directions and which are to spend, from the current moment, time lengths ranging from 20 s to 39 s to arrive at the intersection is less than 500 s, it may be determined that the ending time length for the current second time regions and the red/green light duration for the current second time regions are each 40 s. With respect to one direction, the current second time region in the one direction refers to a region between a vehicle closest to the intersection and a vehicle farthest from the intersection among the vehicles which are located behind the current first time region in the direction and which are to spend, from the current moment, time lengths ranging from 20 s to 40 s to arrive at the intersection. In the case that the sum of the expected waiting time lengths of the vehicles which are located behind the current first time regions in the north-south directions and which are to spend, from the current moment, time lengths ranging from 20 s to 50 s to arrive at the intersection is not greater than 500 s, it may be determined that the ending time length for the current second time regions and the red/green light duration for the current second time regions are each 50 s. With respect to one direction, the current second time region in the one direction refers to a region between a vehicle closest to the intersection and a vehicle farthest from the intersection among the vehicles which are located behind the current first time region in the direction and which are to spend, from the current moment, time lengths ranging from 20 s to 50 s to arrive at the intersection.

It should be appreciated that, in order to prevent the frequent switching between the red light signal and the green light signal in one direction, in the case that a difference between the determined ending time length for the current second time regions and the ending time length for the current first time regions is less than a predetermined safety time length (e.g., 5 s), the ending time length for the current second time regions may be set as a sum of the ending time length for the current first time regions and the predetermined safety time length. For example, in the case that the ending time length for the current first time regions is 20 s and the determined ending time length for the current second time regions is 23 s, the ending time length for the current second time regions may be set as 25 s.

Figure 6A:
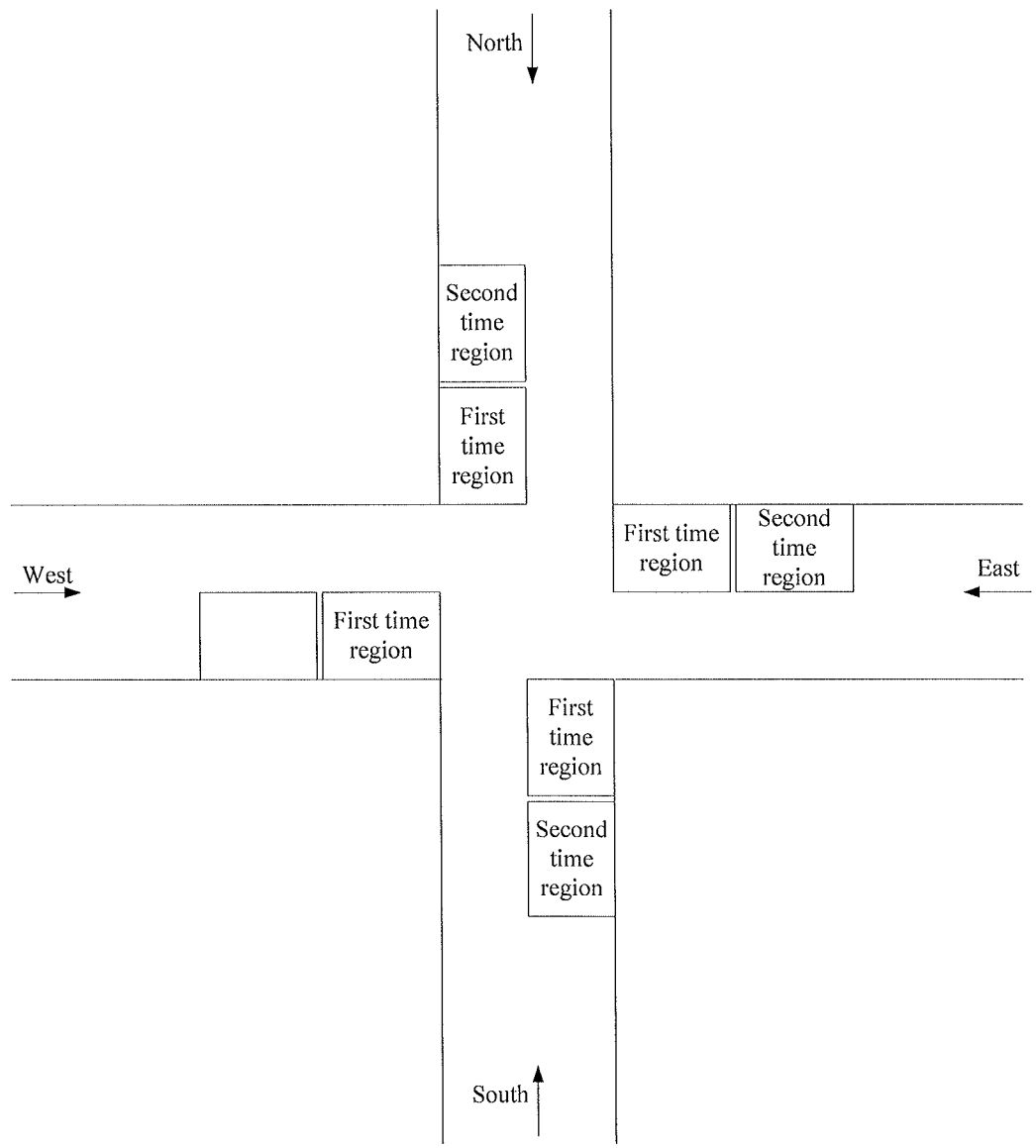
FIG. 6a is a schematic view showing current first time regions and current second time regions in directions respectively pointing to the intersection from the east, the west, the north and the south.

FIG. 6a shows the current first time regions and the current second time regions in the directions from the east, the west, the south and the north. The starting time length for the current first time regions is 0 s, the ending time length for the current first time regions is 20 s, the starting time length for the current second time regions is 20 s, and the ending time length for the current second time regions is 40 s.

In Step 503, after the vehicles in the current second time regions in different directions are determined in Step 502, traffic control signals may be sent to the vehicles in the current second time regions in respective directions. With respect to one direction, the traffic control signal sent to the vehicles in the current second time regions in the one direction and a direction opposite thereto is different from the traffic control signal sent to the vehicles in the current second time regions in the other directions. It should be appreciated that, a timer for the second time length is started simultaneously when sending the traffic control signals to the vehicles in the current second time regions; here, the second time length is 20 s.

For example, the first time regions and the second time regions in different directions in FIG. 4a are previously determined. After 30 s (i.e., the second time length) elapse, the traffic light signal sent to the vehicles in the current first time regions in the north-south directions (i.e., the previously-determined second time regions) is the green light signal and the traffic light signal sent to the vehicles in the current first time regions in the east-west directions is the red light signal. After the determination of the vehicles in the current second time regions, whether or not the vehicles in the current second time regions in the north-south directions include a special vehicle (e.g., a fire truck or an ambulance) may be determined at first. In the case that the vehicles include no special one, the red light signal is sent to the vehicles in the current second time regions in the north-south directions, and the green light signal is sent to the vehicles in the current second time regions in the east-west directions (the red/green light duration is 40 s).

Specially, in the case that the vehicles in the current second time regions in the north-south directions include a special vehicle, it is further determined whether or not the vehicles in the north-south directions which are to spend, from the current moment, time lengths ranging from 40 s (the ending time length for the current second time regions) to 70 s (a sum of the ending time length for the current second time regions and the predetermined first time length) to arrive at the intersection include a special vehicle. If yes, it is further determined whether or not the vehicles in the north-south directions which are to spend, from the current moment, time lengths ranging from 70 s to 100 s to arrive at the intersection include a special vehicle, and so on.

Figure 6B:
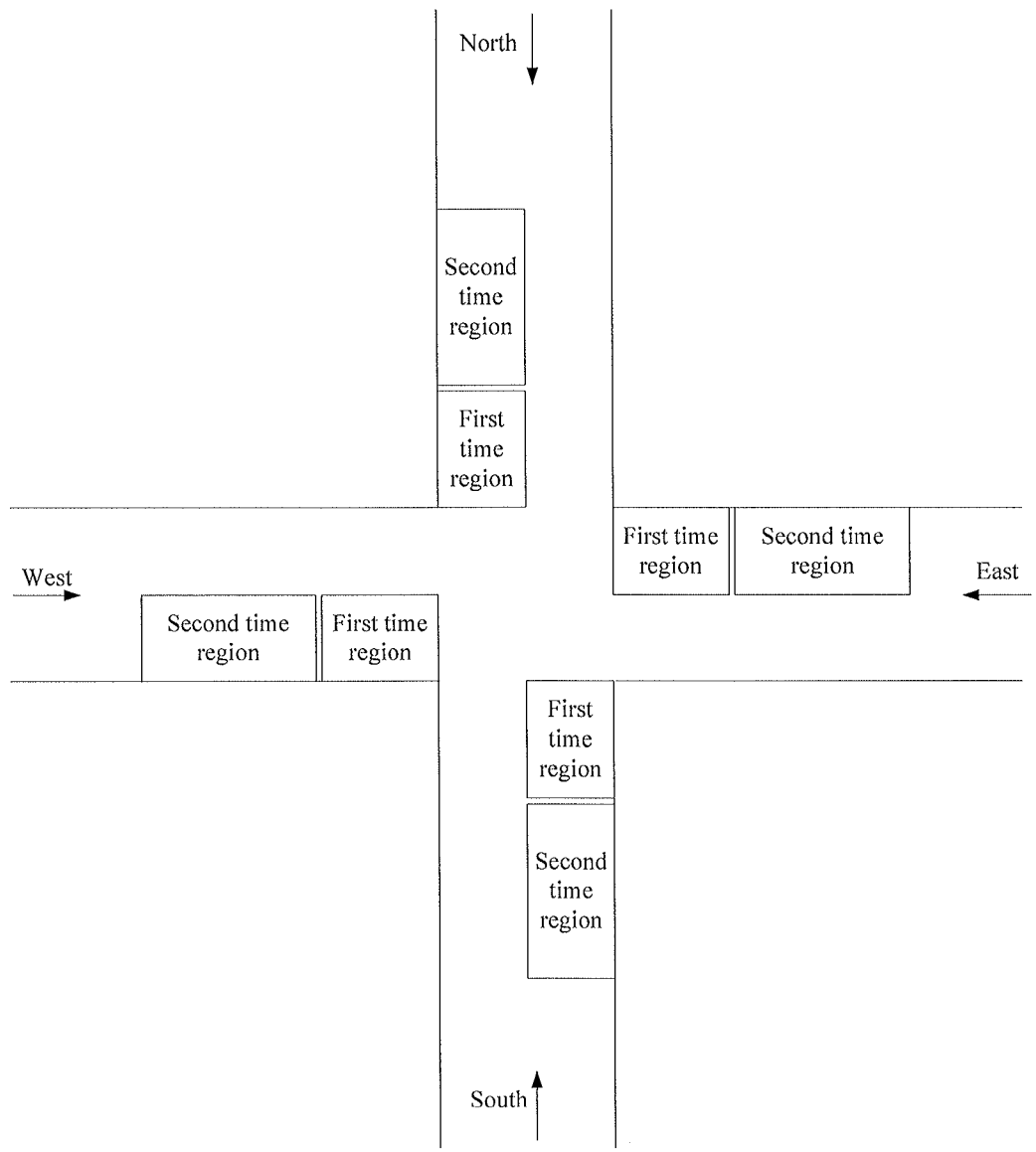
FIG. 6b is another schematic view showing the current first time regions and the current second time regions in directions respectively pointing to the intersection from the east, the west, the north and the south.

In the case that the vehicles in the north-south directions which are to spend, from the current moment, time lengths ranging from 40 s to 70 s to arrive at the intersection include a special vehicle while the vehicles in the north-south directions which are to spend, from the current moment, time lengths ranging from 70 s to 100 s to arrive at the intersection do not include any special vehicle, the green light signal may be sent to the vehicles in the north-south directions which are to spend, from the current moment, time lengths ranging from 20 s (exclusive) to 70 s to arrive at the intersection, and the red light signal may be sent to the vehicles in the east-west directions which are to spend, from the current moment, time lengths ranging from 20 s (exclusive) to 70 s to arrive at the intersection (the red/green light duration is 70 s). At this time, with respect to one direction, the current second time region in the one direction refers to a region between a vehicle closest to the intersection and a vehicle farthest from the intersection among the vehicles which are located behind the current first time region in the one direction and which are to spend, from the current moment, time lengths ranging from 20 s to 70 s to arrive at the intersection, as shown in FIG. 6b.

Optionally, after the vehicles in the current second time regions in respective directions have been determined and before sending traffic control signals to these vehicles in the current second time regions in respective directions, whether or not there is no vehicle in the current second time regions to which a traffic control signal including the red light signal needs to be sent may be determined at first. In the case that there is no vehicle in the current second time regions to which the traffic control signal including the red light signal needs to be sent, it may return to the step of determining whether or not the traffic control signals need to be sent after the vehicles in the current first time regions in different directions pass through the intersection. In the case that there is a vehicle in the current second time regions to which the traffic control signal including the red light signal needs to be sent, traffic control signals may be sent to the vehicles in the current second time regions in respective directions and then it returns to the step of determining whether or not the traffic control signals need to be changed.

Figure 7:
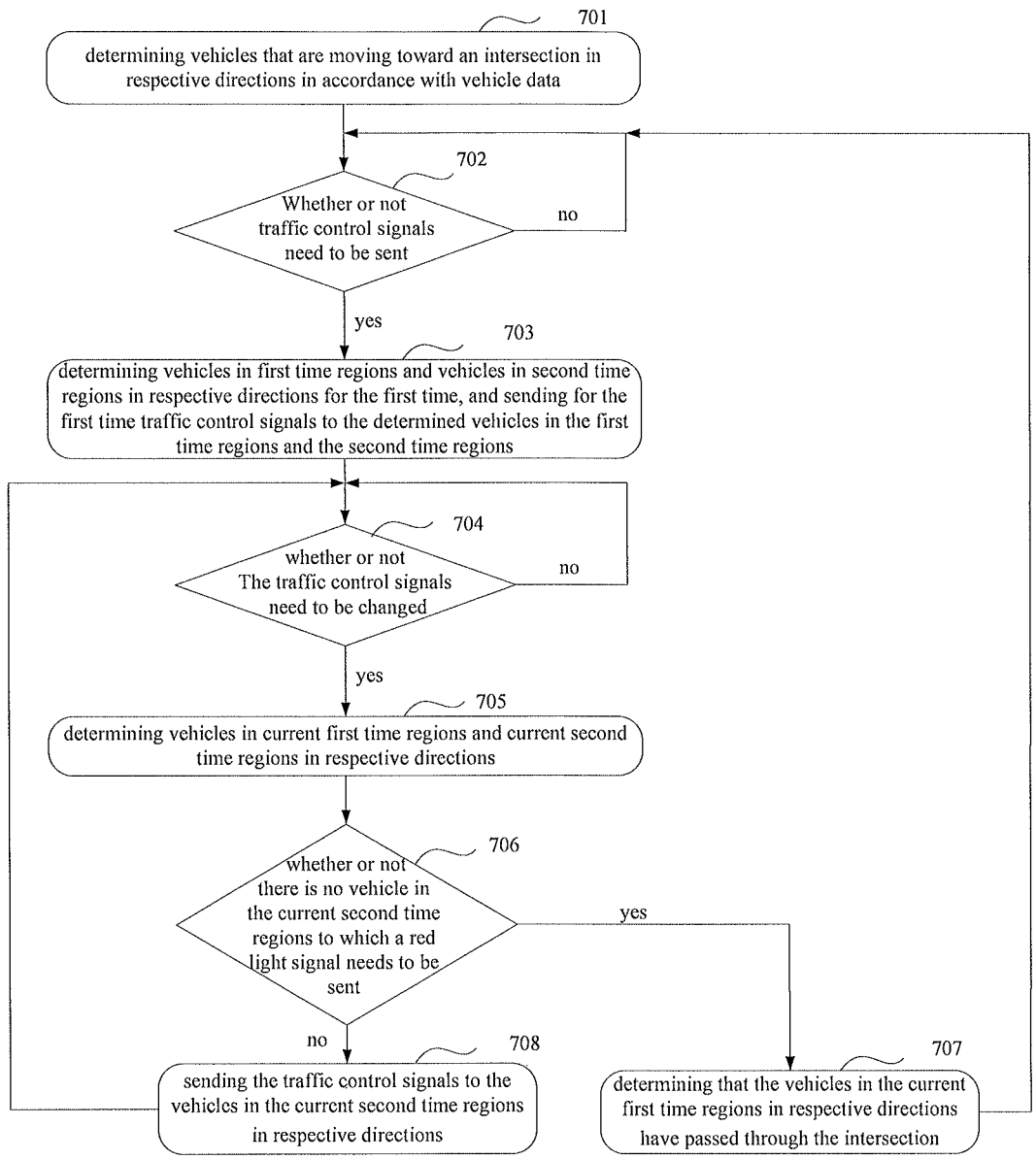
FIG. 7 is a detailed flow chart of the traffic control method according to the first embodiment of the present disclosure.

As shown in FIG. 7, a traffic control method according to an embodiment of the present disclosure may include the following steps.

Step 701 includes: determining vehicles that are moving toward an intersection in respective directions in accordance with vehicle data.

Step 702 includes: determining whether or not traffic control signals need to be sent; if yes, proceeding to Step 703; otherwise, repeating Step 702.

Step 703 includes: determining vehicles in first time regions and second time regions in respective directions initially, and sending the traffic control signals to the vehicles in the initially-determined first time regions and the second time regions in respective directions.

In Step 703, the vehicles in the first time regions are determined in accordance with a predetermined first time length, a predetermined first reference time length and arrival time lengths, and the vehicles in the second time regions are determined in accordance with current road-condition information, the predetermined first time length and the arrival time lengths. With respect to one direction, the traffic control signal sent to the vehicles in the first time regions in the one direction and a direction opposite thereto is different from the traffic control signal sent to the vehicles in the first time regions in the other directions, and the traffic control signal sent to the vehicles in the second time regions in the one direction and the direction opposite thereto is different from the traffic control signal sent to the vehicles in the second time regions in the other directions.

Step 704 includes: determining whether or not the traffic control signals need to be changed; if yes, proceeding to Step 705; otherwise repeating Step 704.

Step 705 includes: determining vehicles in current first time regions and current second time regions in respective directions. In Step 705, the vehicles in the current first time regions in respective directions are determined in accordance with the time lengths corresponding to the previously-determined first time regions in respective directions and the time lengths corresponding to the previously-determined second time regions in respective directions, and the vehicles in the current second time regions in respective directions are determined in accordance with the current road-condition information and the predetermined first time length.

Step 706 includes: determining whether or not there is no vehicle in the current second time regions to which a red light signal needs to be sent; if yes, proceeding to Step 707; otherwise, proceeding to Step 708.

Step 707 includes: determining that the vehicles in the current first time regions in respective directions have passed through the intersection, and returning to Step 702.

Step 708 includes: sending the traffic control signals to the vehicles in the current second time regions in respective directions, and returning to Step 704. With respect to one direction, the traffic control signal sent to the vehicles in the current second time regions in the one direction and a direction opposite thereto is different from the traffic control signal sent to the vehicles in the current second time regions in the other directions.

Second Embodiment

Figure 8:
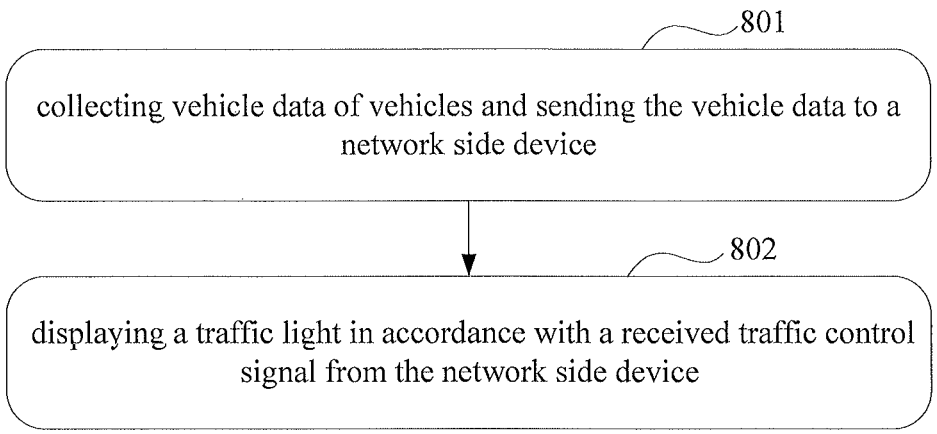
FIG. 8 is a flow chart of a traffic control method according to a second embodiment of the present disclosure.

As shown in FIG. 8, the present disclosure provides in the embodiment a traffic control method, which includes the following steps.

Step 801 includes: collecting vehicle data of vehicles and sending the vehicle data to a network side device.

Step 802 includes: displaying a traffic light in accordance with a received traffic control signal from the network side device.

In Step 801, the vehicle data of one vehicle may include a part of, or all of, position information, speed information, moving direction information of the vehicle.

The position information of the vehicle may include longitude and latitude information as well as elevation information, which may be acquired by an on-board satellite positioning system (e.g., a Global Positioning System or Beidou Positioning System).

The speed information and the moving direction information of the vehicle may be acquired via an on-board TCU, or acquired from an on-board CAN bus via an ECU through an OBD interface, or acquired from an on-board satellite positioning system or a three-dimensional acceleration sensor.

It should be appreciated that, in the second embodiment, the traffic control method may be executed by a terminal. In the case that a distance between the vehicle and the intersection is less than a predetermined value, the vehicle data of the vehicle may be read by a terminal installed on the vehicle and periodically (e.g., every two seconds) reported, by the terminal, to the network side device.

In Step 802, in the case that the vehicle enters a monitoring coverage of the network side device and a certain condition is met, the vehicle may receive the traffic control signal from the network side device.

The traffic control signal from the network side device may be a signal in a certain format. Upon the receipt of the traffic control signal from the network side device, the terminal needs to parse the traffic control signal, so as to acquire a signal that is convenient to display.

Further, in order to ensure the accuracy and the safety of the data, the traffic control signal from the network side device may be encrypted data, and at this time, the terminal also needs to decrypt or verify the received traffic control signal.

The traffic light may be displayed in the following three modes. In mode 1, the traffic light may be displayed by a display module built in the terminal. In mode 2, it may be displayed by an acousto-optic device independent of the terminal. In mode 3, a connection may be established between the terminal and a device having a display screen, e.g., a navigator, so that the traffic light may be displayed by the device such as the navigator.

To be specific, in the case that the received traffic control signal includes a green light signal, a green light may be displayed, and in the case that the received traffic control signal includes a red light signal, a red light may be displayed.

Further, subsequent to the step of displaying the traffic light, the traffic control method further includes: displaying a switched traffic light after it is determined that the traffic light needs to be switched in accordance with time information included in the traffic control signal. The time information included in the traffic control signal may be a red/green light duration, or a time instant at which the traffic light signal is to be switched.

For example, in the case that, at a time instant 10:30:00, the terminal in the vehicle receives, from the network side device, the red light signal and a time instant 10:30:50 for switching the red light signal into the green light signal, the terminal may display the red light, and display the green light at 10:30:50, so as to instruct a driver to drive through the intersection.

Third Embodiment

Based on an identical inventive concept to the first embodiment, the present disclosure provides in the third embodiment a network side device. The implementation in the embodiment may be understood with reference to that in the first embodiment, and thus will not be particularly repeated herein.

Figure 9:
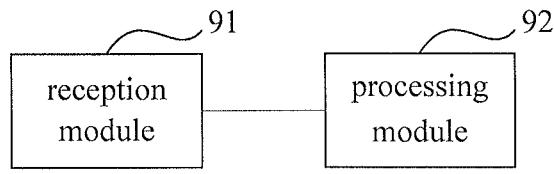
FIG. 9 is a schematic structural diagram of a network side device according to a third embodiment of the present disclosure.

As shown in FIG. 9, the network side device includes a reception module 91 and a processing module 92. The reception module 91 is used to receive vehicle data of all vehicles on roads forming an intersection. The processing module 92 is used to match position information about the vehicles in the vehicle data to road-network information, to establish a real-time matching relationship between the roads and the vehicles, generate traffic circulation information about the intersection in accordance with the vehicle data and the real-time matching relationship, generate traffic control signals corresponding to the vehicles in respective directions in accordance with the traffic circulation information, and send the traffic control signals to the corresponding vehicles.

The processing module 92 is further used to calculate an arrival time length to be spent by each vehicle to arrive at the intersection in accordance with position information of the vehicle in the vehicle data and the road-network information, and divide the vehicles on each road into vehicles in a first time region and vehicles in a second time region in accordance with the arrival time lengths.

The processing module 92 is further used to: after it is determined that the traffic control signals need to be sent, determine the vehicles in the first time region in each direction in accordance with a predetermined first time length, a predetermined first reference time length and the arrival time lengths, determine the vehicles in the second time region in each direction in accordance with current road-condition information, the first time length and the arrival time lengths, send traffic control signals to the vehicles in the first time regions in respective directions, and send traffic control signals to the vehicles in the second time regions in respective directions. With respect to one direction, the traffic control signal sent to the vehicles in the first time regions in the one direction and a direction opposite to the direction is different from the traffic control signal sent to the vehicles in the first time regions in the other directions, and the traffic control signal sent to the vehicles in the second time regions in the one direction and a direction opposite to the one direction is different from the traffic control signal sent to the vehicles in the second time regions in the other directions.

The processing module 92 is further used to send the traffic control signals to the vehicles in the first time regions and the second time regions in respective directions in accordance with the current road-condition information and/or types of the vehicles in the respective regions.

To be specific, the processing module 92 is used to: with respect to one direction, determine a first arrival time length to be spent by each vehicle in a third time region in the one direction to arrive at the intersection and a first arrival time length to be spent by each vehicle in a third time region in a direction opposite to the one direction to arrive at the intersection, and determine second arrival time lengths to be spent by respective vehicles in third time regions in the other directions to arrive at the intersection, the third time regions being determined in accordance with a predetermined second reference time length and the predetermined first reference time length, the second reference time length being longer than the first reference time length and shorter than the first time length; and determine, among all the first arrival time lengths and all the second arrival time lengths, whether or not there are one first arrival time length and one second arrival time length, an absolute value of a difference between which is less than a predetermined safety time length, if yes, determine that the traffic control signals need to be sent, otherwise, determine that the traffic control signals do not need to be sent.

The processing module 92 is further used to: after the traffic control signals are sent to the vehicles in the first time regions and the second time regions in respective directions, determine whether or not the traffic control signals need to be changed; after it is determined that the traffic control signals need to be changed, determine vehicles in current first time regions in respective directions in accordance with the time lengths corresponding to the previously-determined first time regions and the time lengths corresponding to the previously-determined second time regions in respective directions; determine vehicles in current second time regions in respective directions in accordance with the current road-condition information and the first time length; and send the traffic control signals to the vehicles in the current second time regions in respective directions, and return to determine whether or not the traffic control signals need to be changed. With respect to one direction, the traffic control signal sent to the vehicles in the current second time regions in the one direction and in a direction opposite to the one direction is different from the traffic control signal sent to the vehicles in the current second time regions in the other directions.

The processing module 92 is further used to determine whether or not a second time length expires; if yes, determine that the traffic control signals need to be changed; otherwise, determine that the traffic control signals do not need to be changed. The second time length is determined in accordance with the time lengths corresponding to the previously-determined first time regions.

The processing module 92 is further used to, after the vehicles in the current second time regions in respective directions are determined, in the case that there is no vehicle in the second time regions to which a traffic control signal including a red light signal needs to be sent, return to determine whether or not the traffic control signals need to be changed after the vehicles in the current first time regions in respective directions pass through the intersection.

It should be appreciated that, in the third embodiment of the present disclosure, the above descriptions merely relate to the main functions of the components of the network side device. Of course, these components may also be used to achieve the functions mentioned in the method according to the first embodiment, and meanwhile the network side device may further include logic modules for performing the steps mentioned in the first embodiment.

Fourth Embodiment

Based on an identical inventive concept to the second embodiment, the present disclosure further provides in the fourth embodiment a terminal. The implementation in this embodiment may be understood with reference to that in the second embodiment, and thus will not be particularly repeated herein.

Figure 10:
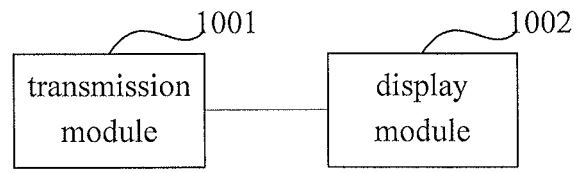
FIG. 10 is a schematic structural diagram of a terminal according to a fourth embodiment of the present disclosure.

As shown in FIG. 10, the terminal includes a transmission module 1001 used to collect vehicle data and send the vehicle data to a network side device, and a display module 1002 used to display a traffic light in accordance with a received traffic control signal from the network side device.

The display module 1002 is used to, in response to a green light signal included in the traffic control signal, display a green light, and in response to a red light signal included in the traffic control signal, display a red light.

The display module 1002 is used to, display a switched traffic light after it is determined that the traffic light needs to be switched in accordance with time information included in the traffic control signal.

It should be appreciated that, in the fourth embodiment of the present disclosure, the above descriptions merely relate to the main functions of the components of the terminal. Of course, these components may also be used to achieve the functions mentioned in the method according to the second embodiment, and meanwhile the terminal may further include logic modules for performing the steps mentioned in the second embodiment.

It should be appreciated by those skilled in the art that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) storing computer-readable program codes thereon.

The present disclosure is described with reference to the flow charts and/or block diagrams showing the method, device (system) and computer program product according to the embodiments of the present disclosure. It should be appreciated that each process and/or block, or combinations thereof, in the flow charts and/or block diagrams may be implemented via computer program commands. These computer program commands may be applied to a general-purpose computer, a special-purpose computer, an embedded processor or any other processor of programmable data processing equipment, so as to form a machine, thereby to obtain the means capable of effecting the functions specified in one or more processes in the flow charts and/or one or more blocks in the block diagrams in accordance with the commands executed by the computer or the processor of the other programmable data processing equipment.

These computer program commands may also be stored in a computer-readable memory capable of guiding the computer or the other programmable data processing equipment to work in a special manner, so as to form a product including a command device capable of effecting the functions specified in one or more processes in the flow charts and/or one or more blocks in the block diagrams.

These computer program commands may also be loaded onto a computer or the other programmable data processing equipment, so as to perform a series of operations thereon and generate the processings implemented by the computer, thereby to provide the steps capable of effecting the functions specified one or more processes in the flow charts and/or one or more blocks in the block diagrams in accordance with the instructions.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

Obviously, the ordinary skilled in the art can make various modifications and alterations to the present disclosure without departing from the spirit and scope thereof. Provided that those modifications and alterations are within the scope of the appended claims of the present disclosure or their equivalents, the present disclosure intends to include all such modifications and alterations.

What is claimed is:
1. A traffic control method for sending traffic control signals to vehicles which are to pass through an intersection, comprising steps of:
  receiving vehicle data of all vehicles on roads forming the intersection;
  matching position information of the vehicles in the vehicle data to road-network information, to establish a real-time matching relationship between the roads and the vehicles;
  generating traffic circulation information about the intersection in accordance with the vehicle data and the real-time matching relationship, and generating traffic control signals corresponding to the vehicles in respective directions in accordance with the traffic circulation information; and
  sending the traffic control signals to the corresponding vehicles;
  wherein the step of matching the position information of the vehicles in the vehicle data to the road-network information, to establish the real-time matching relationship between the roads and the vehicles comprises:
  calculating an arrival time length to be spent by each vehicle to arrive at the intersection in accordance with the position information of the vehicle in the vehicle data and the road-network information; and
  dividing the vehicles on each road into vehicles in a first time region and vehicles in a second time region in accordance with the arrival time lengths; and
  wherein the step of dividing the vehicles on each road into the vehicles in the first time region and the vehicles in the second time region in accordance with the arrival time lengths comprises:
  after it is determined that the traffic control signals need to be sent, determining the vehicles in the first time region in each direction in accordance with a predetermined first time length, a predetermined first reference time length and the arrival time lengths, and determining the vehicles in the second time region in each direction in accordance with current road-condition information, the first time length and the arrival time lengths;
  wherein sending the traffic control signals to the corresponding vehicles further comprises:
  sending traffic control signals to the vehicles in the first time regions in the respective directions, and sending traffic control signals to the vehicles in the second time regions in the respective directions; and wherein with respect to one direction, the traffic control signal sent to the vehicles in the first time regions in the one direction and a direction opposite to the one direction is different from the traffic control signal sent to the vehicles in the first time regions in the other directions, and the traffic control signal sent to the vehicles in the second time regions in the one direction and a direction opposite to the one direction is different from the traffic control signal sent to the vehicles in the second time regions in the other directions.

2. The traffic control method according to claim 1, wherein the step of sending the traffic control signals to the corresponding vehicles comprises:

sending the traffic control signals to the vehicles in the first time regions and the second time regions in the respective directions in accordance with the current road-condition information and/or types of the vehicles in the first time regions and the second time regions.

3. The traffic control method according to claim 1, further comprising:

with respect to one direction, determining a first arrival time length to be spent by each vehicle in a third time region in the one direction to arrive at the intersection and a first arrival time length to be spent by each vehicle in a third time region in a direction opposite to the one direction to arrive at the intersection, and determining second arrival time lengths to be spent by respective vehicles in third time regions in the other directions, wherein the third time regions are determined in accordance with a predetermined second reference time length and the predetermined first reference time length and the second reference time length is longer than the first reference time length and shorter than the first time length; and determining, among all the first arrival time lengths and the second arrival time lengths, whether or not there are one first arrival time length and one second arrival time length, an absolute value of a difference between which is less than a predetermined safety time length; if yes, determining that the traffic control signals need to be sent; and otherwise, determining that the traffic control signals do not need to be sent.

4. The traffic control method according to claim 3, wherein subsequent to the step of sending the traffic control signals to the vehicles in the first time regions and the second time regions in the respective directions, the traffic control method further comprises:

determining whether or not the traffic control signals need to be changed;

determining vehicles in current first time regions in the respective directions in accordance with the time lengths corresponding to the previously-determined first time regions in the respective directions and the time lengths corresponding to the previously-determined second time regions in the respective directions, after it is determined that the traffic control signals need to be changed;

determining vehicles in current second time regions in the respective directions in accordance with current road-condition information and the first time length; and sending the traffic control signals to the vehicles in the current second time regions in the respective directions, and returning to the step of determining whether or not the traffic control signals need to be changed;

wherein with respect to one direction, the traffic control signal sent to the vehicles in the current second time regions in the one direction and in a direction opposite to the one direction is different from the traffic control signal sent to the vehicles in the current second time regions in the other directions.

5. The traffic control method according to claim 4, wherein the step of determining whether or not the traffic control signals need to be changed comprises:

determining whether or not a second time length expires; if yes, determining that the traffic control signals need to be changed; and otherwise, determining that the traffic control signals do not need to be changed, wherein the second time length is determined in accordance with the time lengths corresponding to the previously-determined first time regions.

6. The traffic control method according to claim 4, wherein subsequent to the step of determining the vehicles in the current second time regions in the respective directions, the traffic control method further comprises:

in the case that there is no vehicle in the current second time regions to which a traffic control signal comprising a red light signal needs to be sent, returning to the step of determining whether or not the traffic control signals need to be changed after the vehicles in the current first time regions in the respective directions pass through the intersection.

7. A network side device, comprising a processor and a computer-readable storage medium which stores computer-readable program codes, wherein the computer-readable program codes, when executed by the processor, cause the processor to:

receive vehicle data of all vehicles on roads forming an intersection; and match position information about the vehicles in the vehicle data to road-network information to establish a real-time matching relationship between the roads and the vehicles, generate traffic circulation information about the intersection in accordance with the vehicle data and the real-time matching relationship, generate traffic control signals corresponding to the vehicles in respective directions in accordance with the traffic circulation information, and send the traffic control signals to the corresponding vehicles;

calculate an arrival time length to be spent by each vehicle to arrive at the intersection in accordance with position information of the vehicle in the vehicle data and the road-network information, and divide the vehicles on each road into vehicles in a first time region and vehicles in a second time region in accordance with the arrival time lengths; and determine the vehicles in the first time regions in the respective directions in accordance with a predetermined first time length, a predetermined first reference time length and the arrival time lengths and determine the vehicles in the second time regions in the respective directions in accordance with current road-condition information, the first time length and the arrival time lengths, after it is determined that the traffic control signals need to be sent; and send traffic control signals to the vehicles in the first time regions in the respective directions and send traffic control signals to the vehicles in the second time regions in the respective directions; and wherein with respect to one direction, the traffic control signal sent to the vehicles in the first time regions in the one direction and a direction opposite to the one direction is different from the traffic control signal sent to the vehicles in the first time regions in the other directions, and the traffic control signal sent to the vehicles in the second time regions in the one direction and a direction opposite to the one direction is different from the traffic control signal sent to the vehicles in the second time regions in the other directions.

8. The network side device according to claim 7, wherein the computer-readable program codes further cause the processor to:
send the traffic control signals to the vehicles in the first time regions and the second time regions in the respective directions in accordance with the current road-condition information and/or types of the vehicles in the first time regions and the second time regions.

9. The network side device according to claim 7, wherein the computer-readable program codes further cause the processor to determine whether or not the traffic control signals need to be sent by steps of:
with respect to one direction, determining a first arrival time length to be spent by each vehicle in a third time region in the one direction to arrive at the intersection and a first arrival time length to be spent by each vehicle in a third time region in a direction opposite to the one direction to arrive at the intersection, and determining second arrival time lengths to be spent by respective vehicles in third time regions in the other directions to arrive at the intersection, wherein the third time regions are determined in accordance with a predetermined second reference time length and the predetermined first reference time length, the second reference time length is longer than the first reference time length and shorter than the first time length; and
determining, among all the first arrival time lengths and all the second arrival time lengths, whether or not there are one first arrival time length and one second arrival time length, an absolute value of a difference between which is less than a predetermined safety time length; if yes, determining that the traffic control signals need to be sent; and otherwise, determining that the traffic control signals do not need to be sent.

10. The network side device according to claim 9, wherein the computer-readable program codes further cause the processor to:
after the traffic control signals are sent to the vehicles in the first time regions and the second time regions in the respective directions, determine whether or not the traffic control signals need to be changed; after it is determined that the traffic control signals need to be changed, determine vehicles in current first time regions in the respective directions in accordance with the time lengths corresponding to the previously-determined first time regions in the respective directions and the time lengths corresponding to the previously-determined second time regions in the respective directions; determine vehicles in current second time regions in the respective directions in accordance with current road-condition information and the first time length; and send the traffic control signals to the vehicles in the current second time regions in the respective directions, and return to determine whether or not the traffic control signals need to be changed,
wherein with respect to one direction, the traffic control signal sent to the vehicles in the current second time regions in the one direction and in a direction opposite to the one direction is different from the traffic control signal sent to the vehicles in the current second time regions in the other directions.

11. The network side device according to claim 10, wherein the computer-readable program codes further cause the processor to:
determine whether or not a second time length expires; if yes, determine that the traffic control signals need to be changed; and otherwise, determine that the traffic control signals do not need to be changed,
wherein the second time length is determined in accordance with the time lengths corresponding to the previously-determined first time regions.

12. The traffic control device according to claim 10, wherein the computer-readable program codes further cause the processor to:
after the vehicles in the current second time regions in the respective directions are determined, in the case that there is no vehicle in the current second time regions to which a traffic control signal comprising a red light signal needs to be sent, return to determine whether or not the traffic control signals need to be sent after the vehicles in the current first time regions in the respective directions pass through the intersection.

* * * * *